United States Patent
Wang et al.

(10) Patent No.: US 12,104,029 B1
(45) Date of Patent: Oct. 1, 2024

(54) PREPARATION METHOD OF HIGH-BARRIER ANTIBACTERIAL FLAME-RETARDANT FOOD PACKAGING FILM

(71) Applicant: Northeast Forestry University, Harbin (CN)

(72) Inventors: Lijuan Wang, Harbin (CN); Yuping Ning, Harbin (CN); Na Wei, Harbin (CN); Zijing Pan, Harbin (CN); Jian Li, Harbin (CN)

(73) Assignee: NORTHEAST FORESTRY UNIVERSITY, Harbin (CN)

( * ) Notice: Subject to any disclaimer, the term of this patent is extended or adjusted under 35 U.S.C. 154(b) by 0 days.

(21) Appl. No.: 18/639,945

(22) Filed: Apr. 18, 2024

(30) Foreign Application Priority Data

Sep. 21, 2023 (CN) .......................... 202311227735.3

(51) Int. Cl.
| | |
|---|---|
| *C08J 5/10* | (2006.01) |
| *B29C 71/02* | (2006.01) |
| *B65D 65/38* | (2006.01) |
| *C08J 3/28* | (2006.01) |
| *C08J 5/18* | (2006.01) |

(52) U.S. Cl.
CPC ................ *C08J 5/18* (2013.01); *B65D 65/38* (2013.01); *C08J 3/28* (2013.01); *C08J 7/08* (2013.01); *B65D 2565/387* (2013.01); *C08J 2329/04* (2013.01)

(58) Field of Classification Search
CPC ............. C08J 5/18; B65D 65/38; B29C 39/02
See application file for complete search history.

(56) References Cited

FOREIGN PATENT DOCUMENTS

| CN | 109004270 | * | 12/2018 |
| CN | 109092266 | * | 12/2018 |

* cited by examiner

*Primary Examiner* — Edmund H Lee

(57) ABSTRACT

A preparation method of a high-barrier antibacterial flame-retardant food packaging film solves problems that an existing food packaging film is non-degradable, poor in preservation effect, and inflammable. The preparation method includes: performing blending reaction on chitosan quaternary ammonium salt and phytic acid to generate a polyelectrolyte complex; and adding the polyelectrolyte complex into a polyvinyl alcohol solution, heating the polyvinyl alcohol solution added with the polyelectrolyte complex to obtain a film-forming solution, pouring the film-forming solution into a mold, leveling and drying the film-forming solution to obtain the high-barrier antibacterial flame-retardant food packaging film. The food packaging film has water vapor permeability in $1.82\text{-}2.58\times10^{-8}$ $g \cdot s^{-1} \cdot m^{-1} \cdot Pa^{-1}$, oxygen permeability in $1.63\text{-}12.31$ $cm^3 \cdot mm^{-2} \cdot Pa^{-1} \cdot day^{-1}$, and a value of limiting oxygen index (LOI) in 28.10%-33.33%. The food packaging film performs an instant self-extinguishing behavior after ignition; and can inhibit *Staphylococcus aureus* and *Escherichia coli* when used in packaging.

4 Claims, 16 Drawing Sheets

PREPARATION METHOD OF HIGH-BARRIER ANTIBACTERIAL FLAME-RETARDANT FOOD PACKAGING FILM

CROSS-REFERENCE TO RELATED APPLICATION

This application claims priority to a Chinese patent application No. 202311227735.3, filed to China National Intellectual Property Administration (CNIPA) on Sep. 21, 2023, which is herein incorporated by reference in its entirety.

TECHNICAL FIELD

The disclosure relates to a preparation method of a food packaging film.

BACKGROUND

Food packaging technology plays a crucial role in effectively protecting food characteristics and food safety in a food supply chain. Food packaging can serve as a barrier to protect food from physical damage such as collision and friction, and can also reduce impacts of surrounding environmental factors such as humidity, oxygen, volatile substances on food, and can also block pathogenic microorganisms from infecting the food. However, materials used in traditional food packaging films have some limitations. Firstly, a common material used to prepare the traditional food packaging film is mostly a non-degradable plastic, which brings huge pressure to ecological environment. Secondly, the traditional food packaging film has a single function and a poor preservation effect, and cannot meet consumers' requirements of food quality and food safety. Thirdly, the traditional food packaging film served as the barrier between the food and the surrounding environment of the food as well as an external environment is passive in protection function, and is limited in prolonging service life of the food. Fourthly, most of the materials used for the traditional food packaging films such as paper, film, and plastic are highly flammable, which affects safety of food logistics. Therefore, it is imperative to develop a degradable high-barrier antibacterial flame-retardant food packaging film.

SUMMARY

The disclosure aims to solve the technical problems that an existing food packaging film is not degradable, poor in preservation effect, and flammable. Therefore, the disclosure provides a preparation method of a high-barrier antibacterial flame-retardant food packaging film.

The preparation method of the high-barrier antibacterial flame-retardant food packaging film according to the disclosure is carried out according to the following steps:

step 1, adding chitosan quaternary ammonium salt (i.e., HTCC) into distilled water according to a mass percent concentration of the HTCC in a range of 2% to 4%, and uniformly stirring the HTCC and the distilled water to obtain a chitosan quaternary ammonium salt solution; adding phytic acid (PA) according to a mass percent concentration of the PA of 50% into the chitosan quaternary ammonium salt solution, and stirring the chitosan quaternary ammonium salt solution added with the PA for a range of 0.5 hour (h) to 1 h to obtain a polyelectrolyte complex (abbreviated as PEC, i.e., hydroxylated triazine polymeric acid, abbreviated as HTPA); where a volume of the PA is in a range of 80% to 120% of a volume of the chitosan quaternary ammonium salt solution;

step 2, adding polyvinyl alcohol (PVA) into distilled water according to a mass percent concentration of the PVA in a range of 0.02 grams per milliliter (g/mL) to 0.04 g/mL, and stirring the PVA and the distilled water for 1-1.5 h at a temperature of 70-80 degrees Celsius (° C.) to obtain a polyvinyl alcohol solution; adding the PEC into the polyvinyl alcohol solution according to a volume ratio of the polyvinyl alcohol solution to the PEC of 100:(2-4), stirring the polyvinyl alcohol solution added with the PEC for 1-1.5 h at a temperature of 70-80° C. to obtain a mixture, and defoaming the mixture in an ultrasonic instrument for 30 to 60 minutes (min) to obtain a film-forming solution; and step 3, pouring the film-forming solution into a mold, and leveling the film-forming solution in the mold and then drying the leveled film-forming solution to obtain the high-barrier antibacterial flame-retardant food packaging film.

In an embodiment, in the step 1, after the chitosan quaternary ammonium salt is added into the distilled water, a time for the stirring the chitosan quaternary ammonium salt and the distilled water is in a range of 0.5 h to 1 h to obtain the chitosan quaternary ammonium salt solution.

In an embodiment, in the step 3, a time for the drying is in a range of 24 h to 48 h; and a temperature for the drying is in a range of 50° C. to 60° C.

In the disclosure, a stable chitosan quaternary ammonium salt/phytic acid polyelectrolyte, that is, the PEC (i.e., HTPA), is prepared from the HTCC and the PA by a simple solution blending method, then the PEC is added to a PVA matrix, and the PEC added with the PVA matrix is stirred at 80° C. for a certain period of time, and then poured into the mold for drying to prepare the food packaging film (i.e., the high-barrier antibacterial flame-retardant food packaging film). The PA is a non-toxic, renewable, low-cost natural compound extracted from plants such as soybeans and corn, and has a special structure with six phosphate groups. The HTCC is a derivative of chitosan containing a large amount of positive charges, and the PEC prepared by the HTCC and the PA is higher in nitrogen content and has positive charges, thereby making the PEC become an ideal nitrogen source of an intumescent flame-retardant (IFR) system and a condensed phase flame-retardant system. The PEC has excellent antibacterial property and flame retardancy. After the PEC is added to the PVA matrix, the antibacterial property and flame retardancy of the PVA are greatly improved. Meanwhile, the PVA is a polymer that is biodegradable, good in film-forming, and non-toxic, and has biocompatibility. The food packaging film according to the disclosure exhibits excellent flame retardancy, has a high value in limiting oxygen index (LOI), and can realize an instant self-extinguishing behavior. After combustion, the food packaging film forms a special rich-phosphorus carbon layer with dense exterior and porous interior. Meanwhile, the food packaging film has good antibacterial effects on both *Escherichia coli* (*E. coli*) and *Staphylococcus aureus* (*S. aureus*), and is high barrier, antibacterial, and flame-retardant.

The disclosure has the following advantages.

(1) All processes of the preparation method according to disclosure are green, low-carbon, and pollution-free, thereby obtaining the safe and green food packaging film.

(2) The food packaging film prepared in the disclosure has water vapor permeability in $1.82\text{-}2.58\times10^{-8}$ $g \cdot s^{-1} \cdot m^{-1} \cdot Pa^{-1}$, and oxygen permeability in $1.63\text{-}12.31$ $cm^3 \cdot mm^{-2} \cdot Pa^{-1} \cdot day$, which improves barrier properties of a PVA film.

(3) The food packaging film prepared in the disclosure has excellent flame retardancy, improves the value of LOI (i.e., 28.10%-33.33%) by using synergistic effect between the HTCC and the PA, and realizes the instant self-extinguishing behavior after ignition.

(4) The food packaging film prepared in the disclosure has good antibacterial properties, an antibacterial rate for the S. aureus is 100.00%, and an antibacterial rate for the E. coli is in a range of 60.22% to 100.00%.

(5) The food packaging film prepared in the disclosure has an obvious preservation effect on packaging pork. Compared with the PVA film, the pork packaged by the food packaging film prepared in the disclosure has a full ruddy appearance, a lower weight loss rate (WLR) in 53.00%-71.00%, a total viable count in 223-17 colony-forming unit per gram (CFU/g), and a malondialdehyde content in 1.02-0.56 milligrams per kilogram (mg/kg) after stored for 9 days under a temperature of 4° C. The food packaging film prepared in the disclosure is used for packaging the fresh pork, thereby effectively delaying deterioration of the pork.

DETAILED DESCRIPTION OF EMBODIMENTS

Embodiment 1

Figure 1:
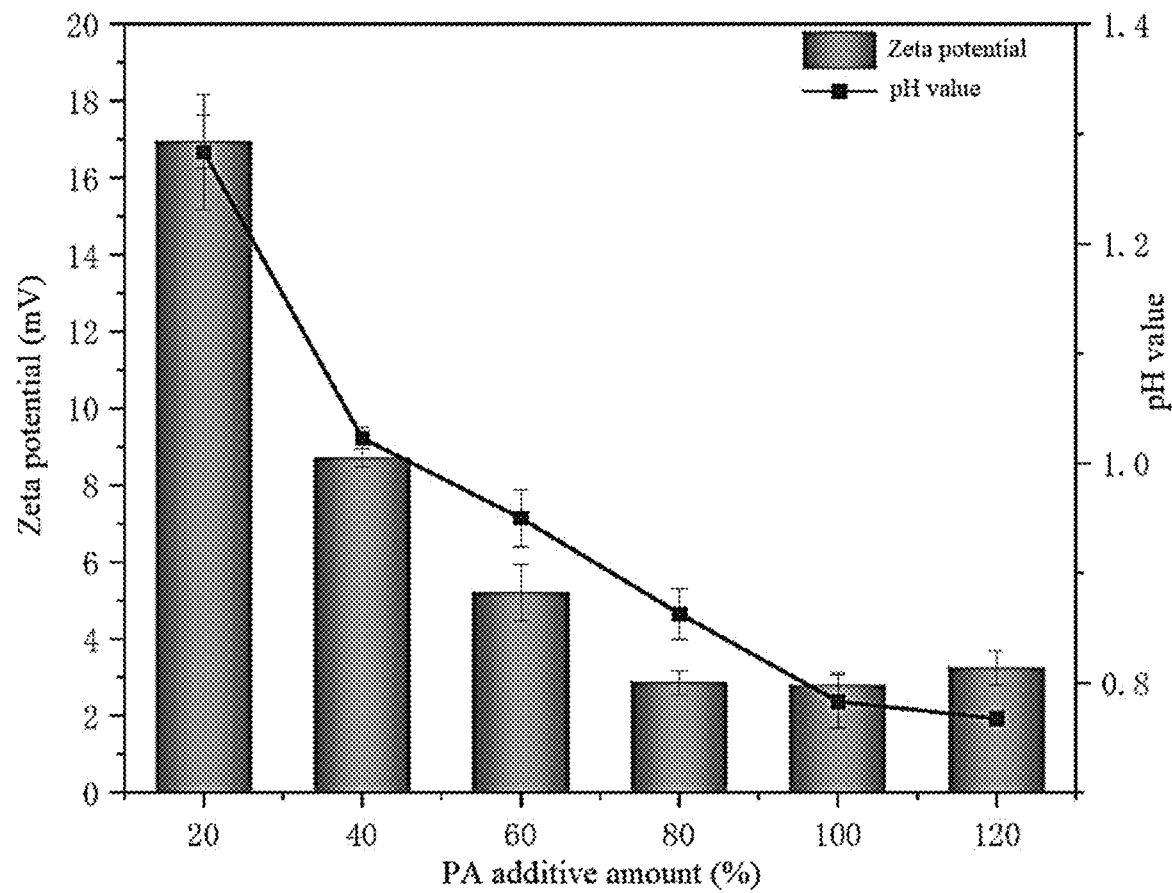
FIG. 1 illustrates a schematic diagram of results of zeta potentials and power of hydrogen (pH) of polyelectrolyte complexes (abbreviated as PEC, i.e., HTPA) prepared in step 1 according to embodiments 1-6.

In the present embodiment, it discloses a preparation method of a high-barrier antibacterial flame-retardant food packaging film, including the following steps.

Step 1, chitosan quaternary ammonium salt (i.e., N-(2-hydroxypropyl)-3-trimethylammonium chitosan chloride abbreviated as HTCC) is added into distilled water according to a mass percent concentration of the HTCC to be 2% to obtain a first mixed solution, and the first mixed solution is stirred for 30 minutes (min) to obtain a chitosan quaternary ammonium salt solution. Phytic acid ($C_6H_{18}O_{24}P_6$ abbreviated as PA) according to a mass percent concentration of the PA to be 50% is added into the chitosan quaternary ammonium salt solution, where a volume of the PA is 80% of a volume of the chitosan quaternary ammonium salt solution, and the chitosan quaternary ammonium salt solution added with the PA is stirred for 40 min to obtain a polyelectrolyte complex (abbreviated as PEC, i.e., hydroxylated triazine polymeric acid abbreviated as HTPA).

Step 2, 6 grams (g) of polyvinyl alcohol (PVA) is added into 300 milliliters (mL) of distilled water to obtain a second mixed solution, and the second mixed solution is stirred for 1 hour (h) at a temperature of 80 degrees Celsius (° C.) to obtain a PVA solution, where a mass percent concentration of the PVA is 0.02 grams per milliliter (g/mL). 3 mL of the HTPA is added into the PVA solution to stir for 1 h at a temperature of 80° C., thereby to obtain a mixture, and then the mixture is placed in an ultrasonic instrument for defoaming for 30 min to obtain a film-forming solution.

Step 3, the film-forming solution is poured into a mold with a size of length×width of 27 centimeter (cm)×27 cm, and the film-forming solution is leveled in the mold and then the leveled film-forming solution is dried at a temperature of 60° C. for 24 h to obtain the high-barrier antibacterial flame-retardant food packaging film, denoted as a PVA-$HTPA_3$ film.

Embodiment 2

In the present embodiment, a difference between the present embodiment and the embodiment 1 is that the volume of the PA in the step 1 is 20% of the volume of the chitosan quaternary ammonium salt solution; and other steps are the same as those in the embodiment 1.

Embodiment 3

In the present embodiment, a difference between the present embodiment and the embodiment 1 is that the volume of the PA in the step 1 is 40% of the volume of the chitosan quaternary ammonium salt solution; and other steps are the same as those in the embodiment 1.

Embodiment 4

In the present embodiment, a difference between the present embodiment and the embodiment 1 is that the volume of the PA in the step 1 is 60% of the volume of the chitosan quaternary ammonium salt solution; and other steps are the same as those in the embodiment 1.

Embodiment 5

In the present embodiment, a difference between the present embodiment and the embodiment 1 is that the volume of the PA in the step 1 is 100% of the volume of the chitosan quaternary ammonium salt solution; and other steps are the same as those in the embodiment 1.

Embodiment 6

In the present embodiment, a difference between the present embodiment and the embodiment 1 is that the volume of the PA in the step 1 is 120% of the volume of the chitosan quaternary ammonium salt solution; and other steps are the same as those in the embodiment 1.

Embodiment 7

In the present embodiment, a difference between the present embodiment and the embodiment 1 is that in the step 2, 6 mL of the HTPA is added into the PVA solution; and other steps are the same as those in the embodiment 1, and an obtained high-barrier antibacterial flame-retardant food packaging film is denoted as a PVA-$HTPA_6$ film.

Embodiment 8

In the present embodiment, a difference between the present embodiment and the embodiment 1 is that in the step 2, 9 mL of the HTPA is added into the PVA solution; and other steps are the same as those in the embodiment 1, and an obtained high-barrier antibacterial flame-retardant food packaging film is denoted as a PVA-$HTPA_9$ film.

Embodiment 9

In the present embodiment, a difference between the present embodiment and the embodiment 1 is that in the step 2, 12 mL of the HTPA is added into the PVA solution; and other steps are the same as those in the embodiment 1, and an obtained high-barrier antibacterial flame-retardant food packaging film is denoted as a PVA-$HTPA_{12}$ film.

Comparative Example 1

In the present comparative example, a packaging film is prepared according to the following steps: 6 g of PVA is added into 300 mL of distilled water, the PVA in the distilled water is stirred for 1 h at a temperature of 80° C. to obtain a PVA solution, and then the PVA solution is defoamed in an ultrasonic instrument for 30 min to obtain a film-forming solution. The film-forming solution is poured into a mold with a size of length×width of 27 cm×27 cm, and is leveled in the mold, and then the leveled film-forming solution is dried at a temperature of 60° C. for 24 h to obtain the packaging film, which is denoted as a PVA film.

Comparative Example 2

In the present comparative example, a packaging film is prepared according to the following steps: 6 g of PVA is added into 300 mL of distilled water, the PVA in the distilled water is stirred for 1 h at a temperature of 80° C. to obtain a PVA solution, where a mass percent concentration of the PVA is 0.02 g/mL. 6 mL of a HTCC solution with a mass percent concentration of 2% is added into the PVA solution to stir for 1 h at a temperature of 80° C., thereby to obtain a mixture, and then the mixture is placed in an ultrasonic instrument for defoaming for 30 min to obtain a film-forming solution. The film-forming solution is poured into a mold with a size of length×width of 27 centimeter (cm)×27 cm, and the film-forming solution is leveled in the mold and then the leveled film-forming solution is dried at a temperature of 60° C. for 24 h to obtain the packaging film, which is denoted as a PVA-$HTCC_6$ film.

Comparative Example 3

In the present comparative example, a packaging film is prepared according to the following steps: 6 g of PVA is added into 300 mL of distilled water, the PVA in the distilled water is stirred for 1 h at a temperature of 80° C. to obtain a PVA solution, where a mass percent concentration of the PVA is 0.02 g/mL. 6 mL of a PA solution with a mass percent concentration of 50% is added into the PVA solution to stir for 1 h at a temperature of 80° C., thereby to obtain a mixture, and then the mixture is placed in an ultrasonic instrument for defoaming for 30 min to obtain a film-forming solution. The film-forming solution is poured into a mold with a size of length×width of 27 centimeter (cm)×27 cm, and the film-forming solution is leveled in the mold and then the leveled film-forming solution is dried at a temperature of 60° C. for 24 h to obtain the packaging film, which is denoted as a PVA-PA$_6$ film.

Figure 2:
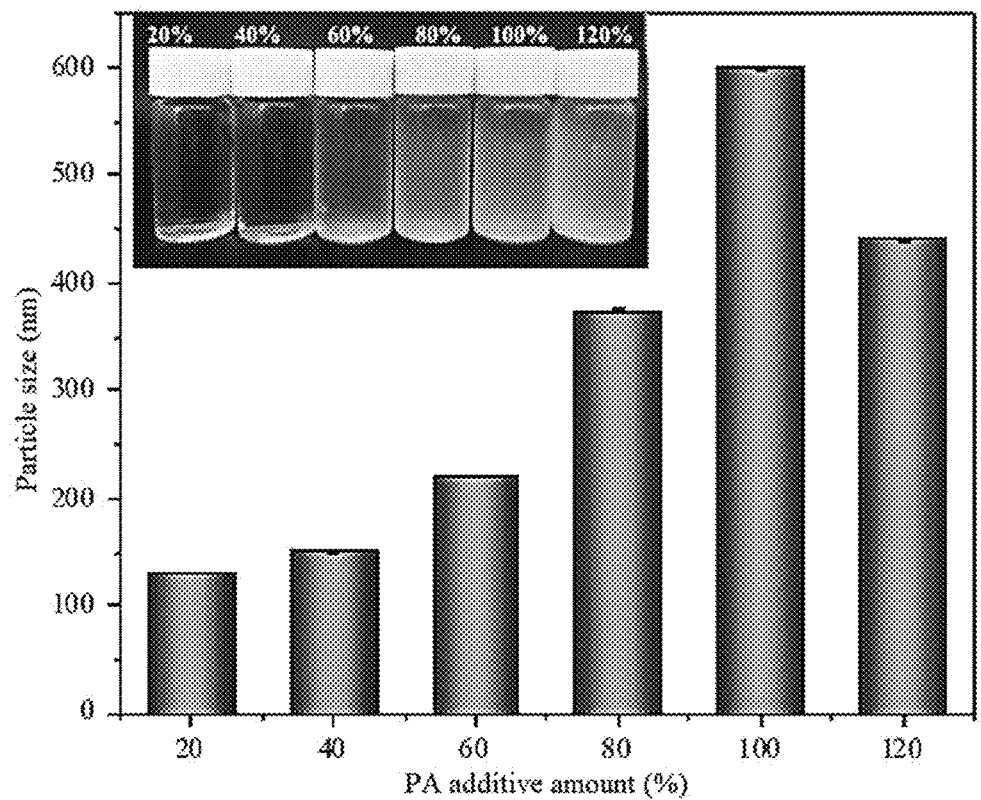
FIG. 2 illustrates a schematic diagram of particle sizes of the HTPA prepared in the step 1 according to the embodiments 1-6.

Tests for zeta potentials, power of hydrogen (pH) values, and particle sizes of the HTPA prepared in the step 1 of the embodiments 1-6 are performed. A method of the test for the zeta potential includes: using a Malvern zeta potential measuring instrument to test the solution (i.e., the chitosan quaternary ammonium salt solution added with the PA). Results of the zeta potentials and the pH values of the HTPA are shown in FIG. 1, and the particle sizes of the HTPA prepared in the embodiments 1-6 are shown in FIG. 2. It can be seen from FIG. 1 that the zeta potentials of the HTPA with different PA additive amount gradually decrease as an additive amount of the PA increases, and the zeta potential of the HTPA reaches a stable state when the additive amount of the PA reaches 80%. These results reflect that strong anionic groups in the PA combine with cations in the HTCC, which reduces a charge density of the system. However, as the PA additive amount is further increased, the pH value of the HTPA drops dramatically, which results in protonation of phosphate groups and prevents further compounding of the PA and the HTCC. Generally, low levels of molecular rejection may facilitate contact between polymers with opposite charges, facilitating ion pairs to form the PEC with a more stable network structure and higher crosslink density, imparting enhanced mechanical strength and stability to the PEC. As can be seen from FIG. 2, as the additive amount of the PA increases, the particle size of the HTPA is first increased and then decreased. The increase in particle size is related to the decrease of zeta potential, and weak electrostatic repulsion is insufficient to overcome Van der Waals force and hydrophobic force. As the additive amount of the PA further increases, a slightly increased zeta potential will prevent aggregation between the HTCC and the PA resulting in a decrease in the particle size of the HTPA. Moreover, a photograph of the HTPA prepared by the embodiments 1-6 is observed to find that the solution remains transparent at a low PA level because that strong electrostatic repulsion between components of the solution prevents the formation of the HTPA. When more PA is added, a relatively stable colloidal dispersion is formed without significant precipitation. Based on the above-mentioned results, the HTPA containing 80% to 120% PA have a high crosslinking density, a stable network structure, and an acceptable particle size, respectively, which is beneficial to improve qualities of the prepared food packaging films (also referred to the high-barrier antibacterial flame-retardant food packaging films).

Figure 3:
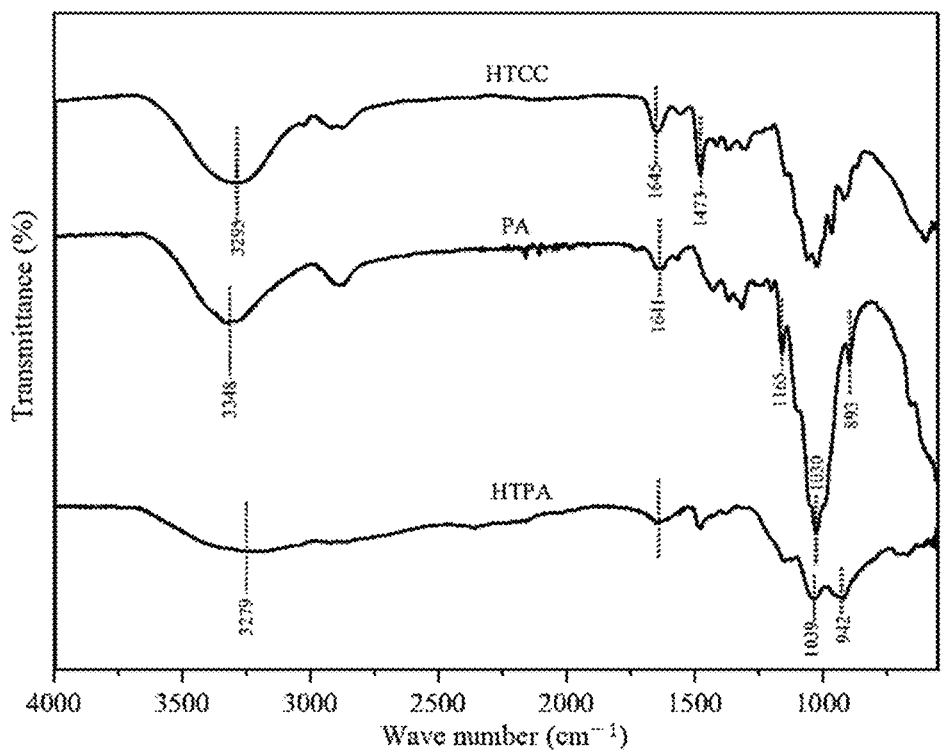
FIG. 3 illustrates a Fourier transform infrared (FT-IR) spectrogram of the HTPA prepared in the step 1, chitosan quaternary ammonium salt (i.e., HTCC), and phytic acid (PA) according to the embodiment 1.
Figure 4:
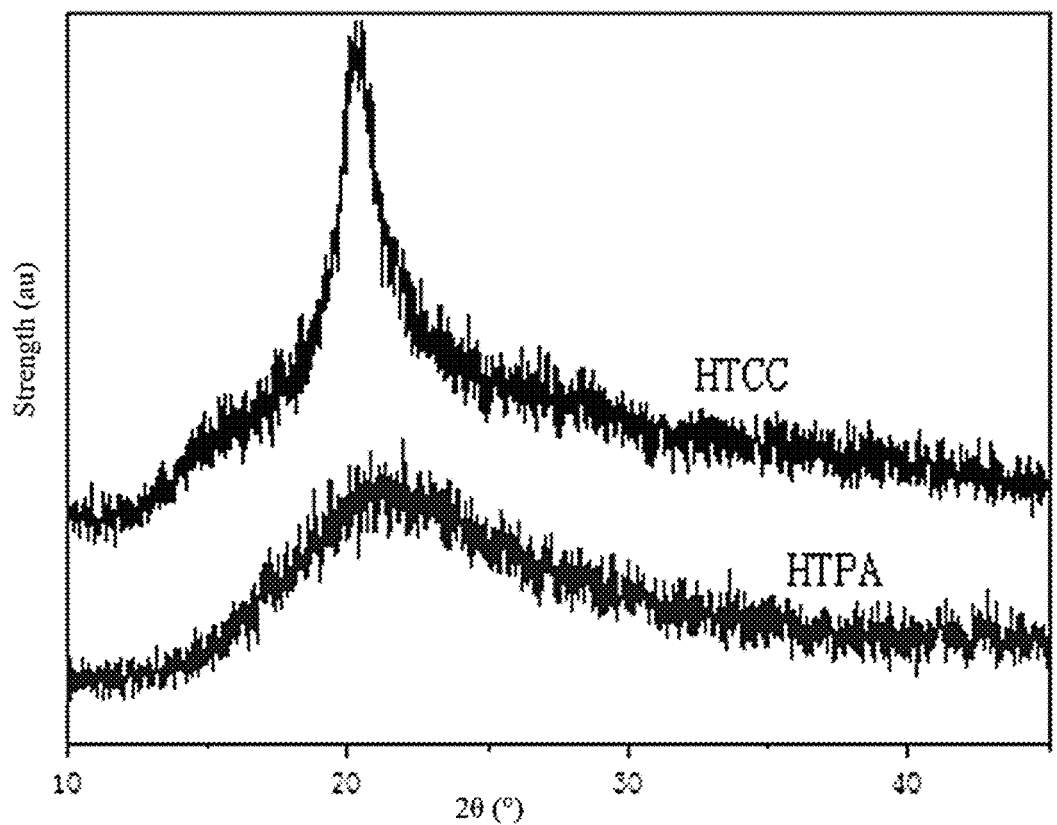
FIG. 4 illustrates an X-ray diffraction (XRD) spectrogram of the HTPA, the HTCC, and the PA prepared in the step 1 according to the embodiment 1.

The PEC (i.e., HTPA) prepared in the step 1 of the embodiment 1, the chitosan quaternary ammonium salt (i.e., HTCC), and the PA are subjected to tests by using Fourier transform infrared (FT-IR) spectroscopy and X-ray diffraction (XRD) to obtain a FT-IR spectrogram as shown in FIG. 3 and an XRD spectrogram as shown in FIG. 4. As can be seen in FIG. 3, in view of the HTCC spectrum, there is a broad peak at about 3295 cm$^{-1}$ due to stretching vibrations of a hydroxyl group (O—H) and a nitrogen hydrogen group (N—H). There are absorption peaks at 1645 cm$^{-1}$ and 1555 cm$^{-1}$ corresponding to a bending vibration of the N—H and a stretching vibration of a carbon nitrogen group (C—N), respectively. There is a characteristic peak at 1473 cm$^{-1}$ related to a methyl group (—CH$_3$) in a quaternary ammonium group. In addition, due to the stretching vibration of the O—H, the PA spectrum has a broad absorption peak at 3642-3000 cm$^{-1}$. There are absorption bands at 1165 cm$^{-1}$, 1030 cm$^{-1}$, and 893 cm$^{-1}$ because of stretching vibrations of a phosphorus-oxygen double bond group (P=O), a phosphorus-oxygen single bond group (P—O), and a phosphorus-oxygen-hydrogen group (P—OH), respectively. Compared with the HTCC spectrum and the PA spectrum, there are some significant variations in the HTPA spectrum. The characteristic peaks of O—H and N—H become wider and weaker, and move significantly to a lower wave number due to ion pairs formed by hydrogen bond interaction between the hydroxyl group and the amino group and protonated amino electrostatic binding. It can be seen from FIG. 4 that a characteristic diffraction peak of the HTCC appears at 2θ=20.44. A diffraction spectrogram of the HTPA shows wider and weaker peaks because the original hydrogen bonds within the HTCC chain are destroyed by intermolecular hydrogen bonds and electrostatic interactions between the HTCC and the PA, which is not conducive to crystallization.

Figure 5A:
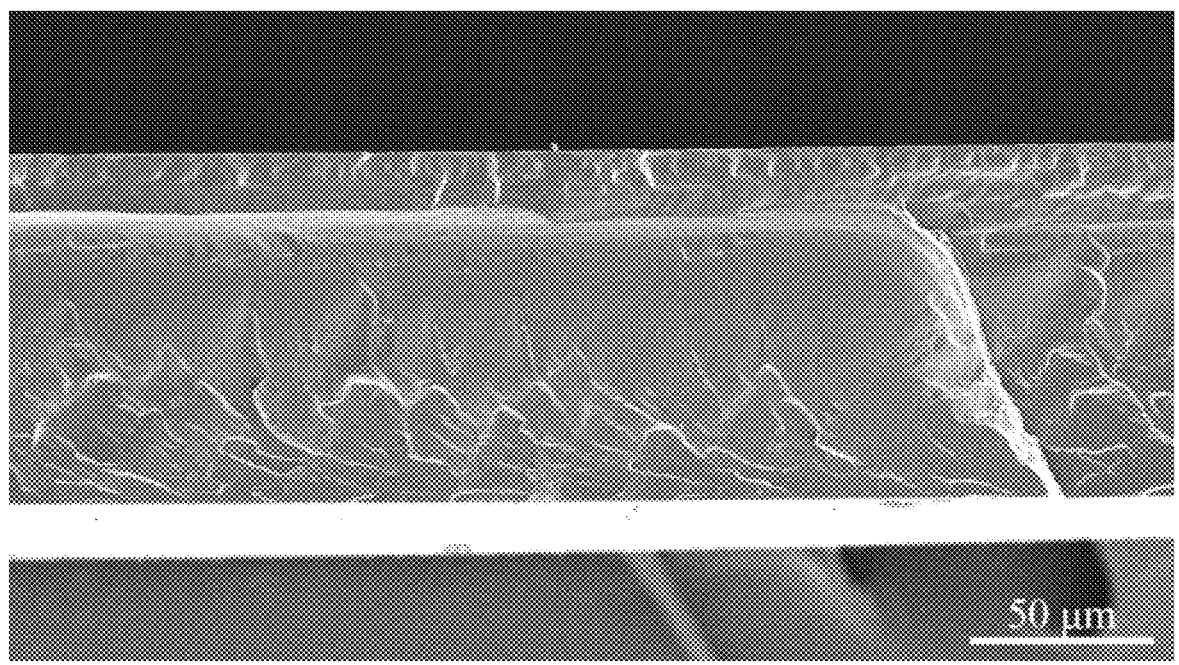
FIGS. 5A-5F illustrate schematic diagrams of cross sections of a polyvinyl alcohol (PVA) film prepared in a comparative example 1, a PVA-HTCC$_6$ film prepared in a comparative example 2, a PVA-PA$_6$ film prepared in a comparative example 3, a PVA-HTPA$_3$ film prepared in the embodiment 1, a PVA-HTPA$_6$ film prepared in an embodiment 7, and a PVA-HTPA$_{12}$ film prepared in an embodiment 9 by a scanning electron microscope (SEM).
Figure 5B:
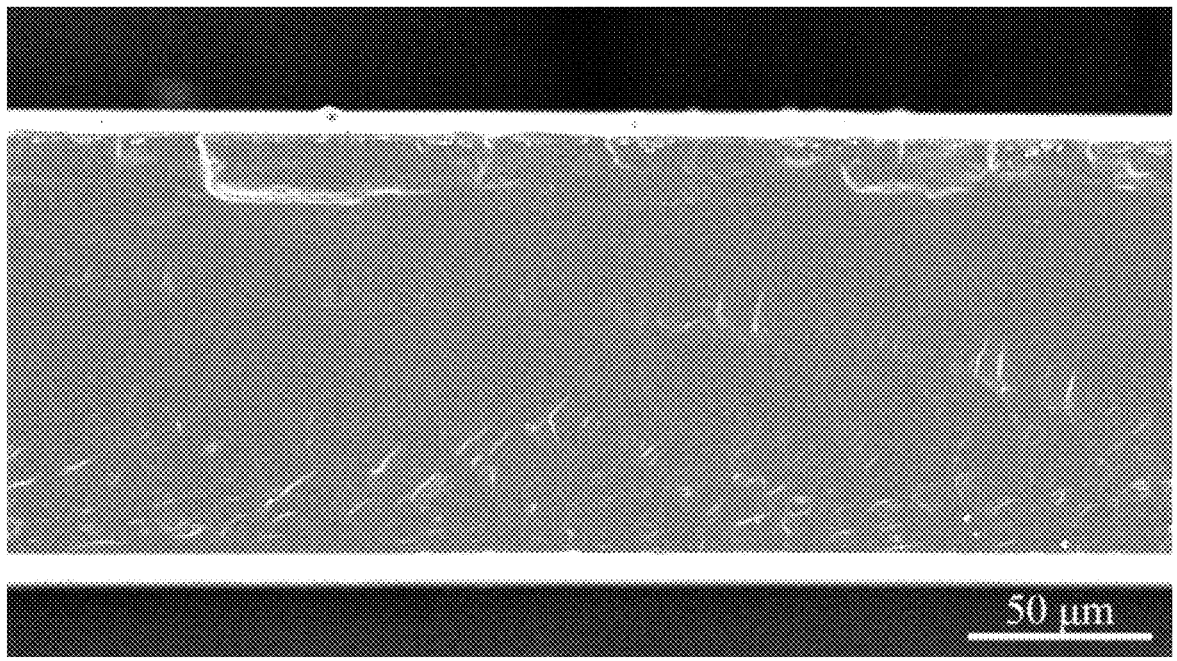
Figure 5C:
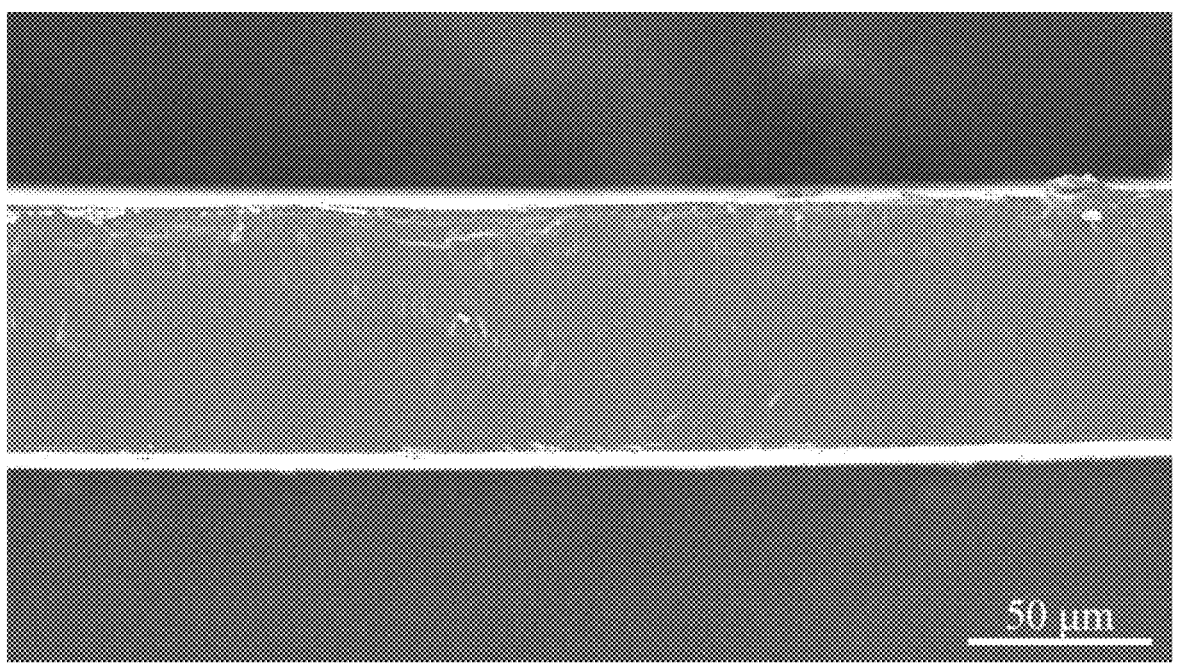
Figure 5D:
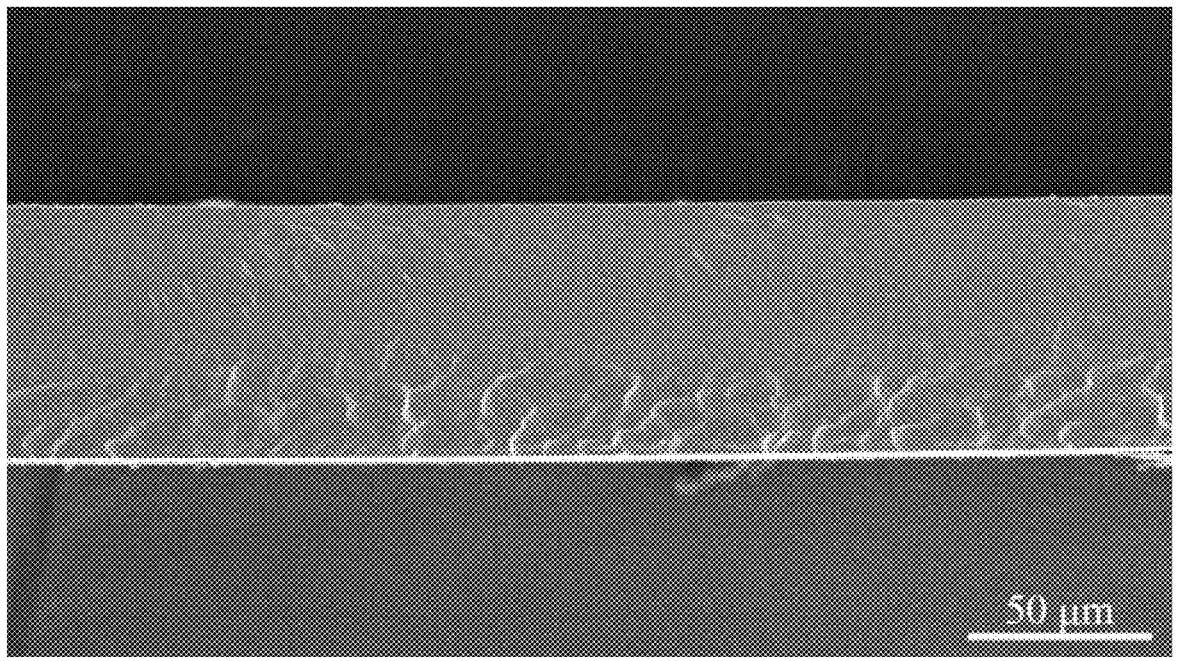
Figure 5E:
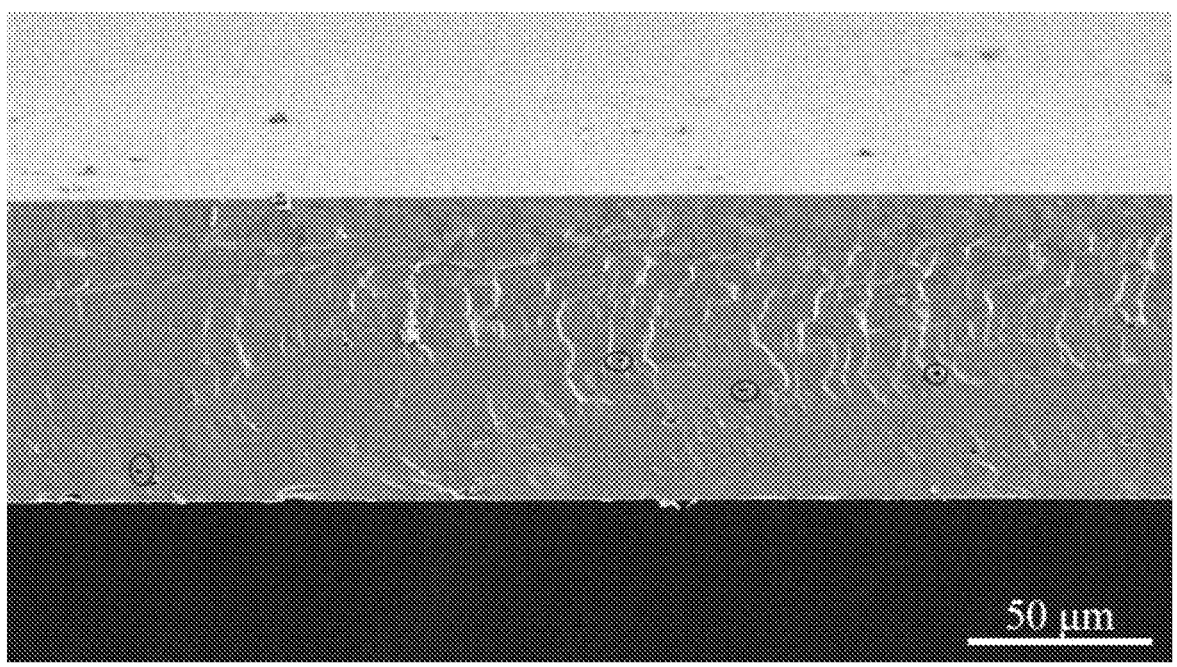
Figure 5F:
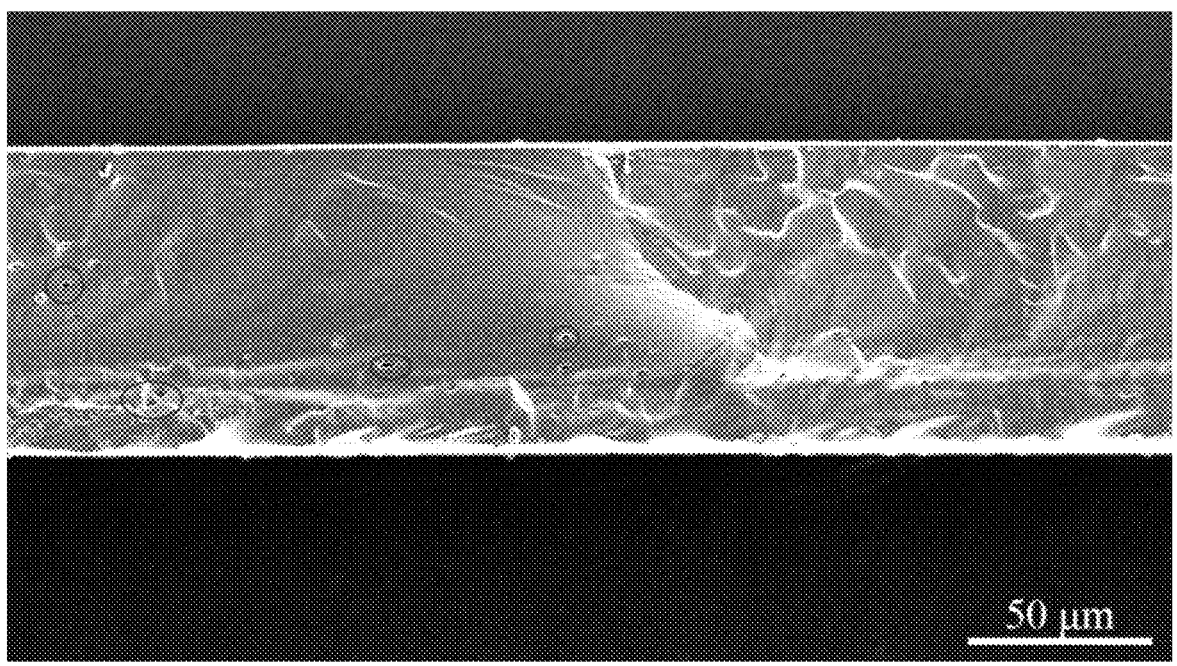
Figure 6:
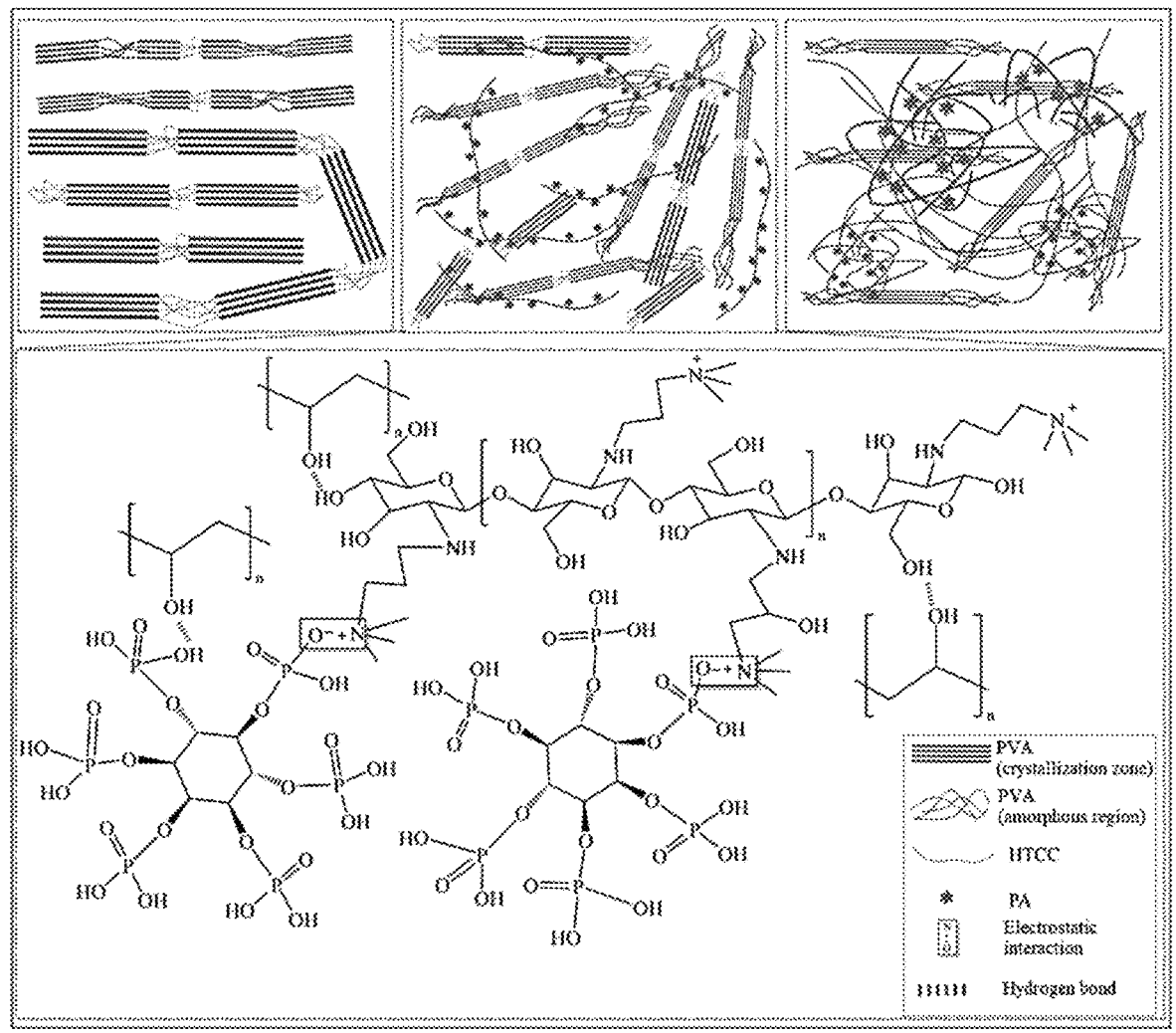
FIG. 6 illustrates a schematic diagram of a molecular crosslinking mechanism in a PVA-HTPA$_x$ film without HTPA, a PVA-HTPA$_x$ film containing a small amount of HTPA, and a PVA-HTPA$_x$ film containing a large amount of HTPA.

FIGS. 5A-5F illustrate schematic diagrams of cross sections of the PVA film prepared in the comparative example 1, the PVA-HTCC$_6$ film prepared in the comparative example 2, the PVA-PA$_6$ film prepared in the comparative example 3, the PVA-HTPA$_3$ film prepared in the embodiment 1, the PVA-HTPA$_6$ film prepared in the embodiment 7, and the PVA-HTPA$_{12}$ film prepared in the embodiment 9 by a scanning electron microscope (SEM). Specifically, FIG. 5A illustrates the PVA film prepared in the comparative example 1, FIG. 5B illustrates the PVA-HTCC$_6$ film prepared in the comparative example 2, FIG. 5C illustrates the PVA-PA$_6$ film prepared in the comparative example 3, FIG. 5D illustrates PVA-HTPA$_3$ film prepared in the embodiment 1, FIG. 5E illustrates the PVA-HTPA$_6$ film prepared in the embodiment 7, and FIG. 5F illustrates the PVA-HTPA$_{12}$ film prepared in the embodiment 9. Therefore, it can be seen from FIGS. 5A-5F that the cross sections of the PVA film, the PVA-HTCC$_{12}$ film, and the PVA-PA$_{12}$ film are uniform and smooth, which means that the PVA has good compatibility with both of the HTCC and the PA. After adding a small amount of the HTPA, the cross section of the film remains relatively smooth. However, significant holes are observed after further addition of the PA because an aggregation of the HTCC and the PA through hydrogen bonding; and the attraction between opposite charges is pulled out after embrittlement in liquid nitrogen. FIG. 6 illustrates a schematic diagram of a molecular crosslinking mechanism in a PVA-HTPA$_x$ film without HTPA, a PVA-HTPA$_x$ film containing a small amount of HTPA, and a PVA-HTPA$_x$ film containing a large amount of HTPA; and results of the cross sections show that the HTPA affects a microstructure of a blended film, thereby affecting the barrier property and mechanical property of the film.

Figure 7:
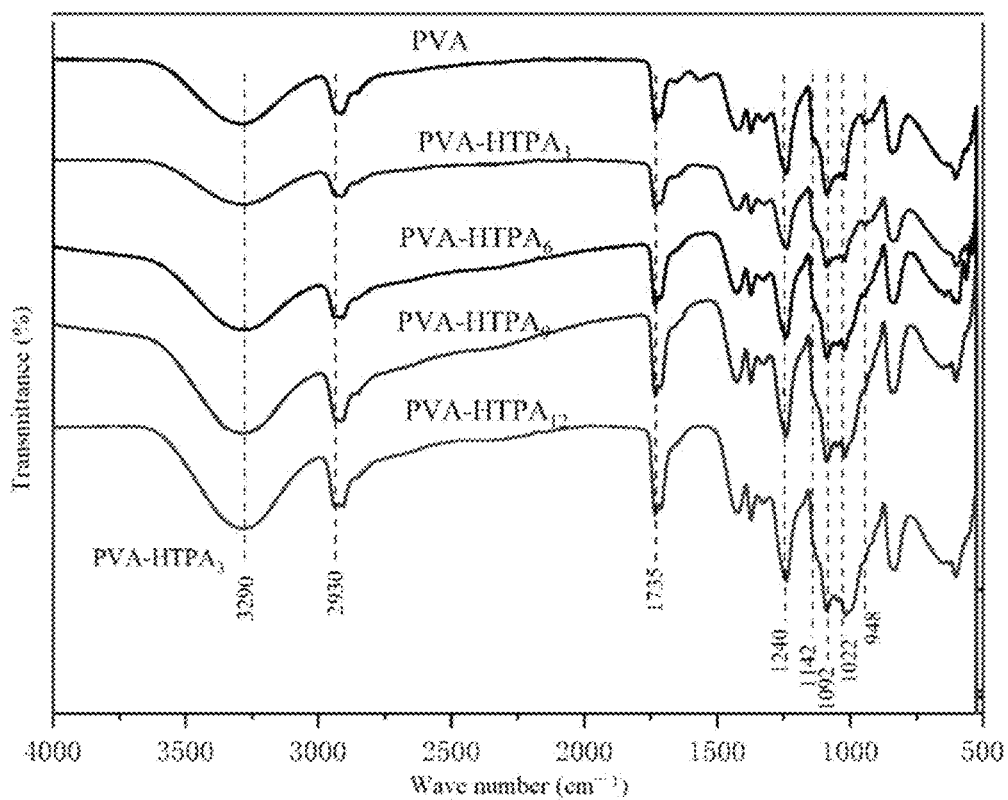
FIG. 7 illustrates a FT-IR spectrogram of the PVA film prepared in the comparative example 1, the PVA-HTPA$_3$ film prepared in the embodiment 1, the PVA-HTPA$_6$ film prepared in the embodiment 7, a PVA-HTPA$_9$ film prepared in an embodiment 8, and the PVA-HTPA$_{12}$ film prepared in the embodiment 9.
Figure 8:
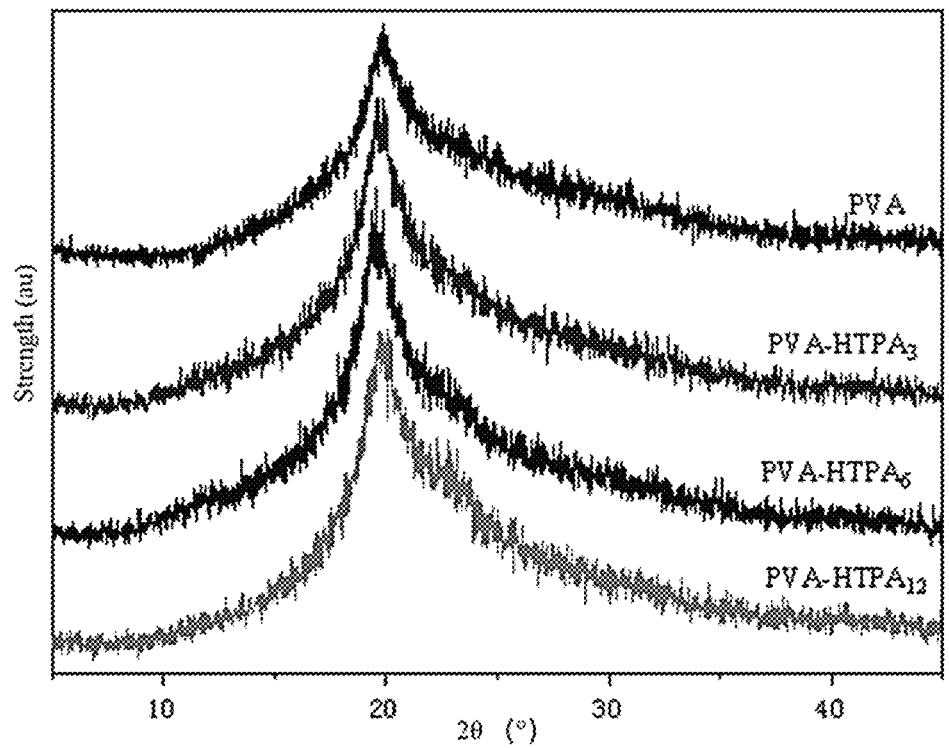
FIG. 8 illustrates an XRD spectrogram of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9.

FIG. 7 illustrates a FT-IR spectrogram of the PVA film prepared in the comparative example 1, the PVA-HTPA$_3$ film prepared in the embodiment 1, the PVA-HTPA$_6$ film prepared in the embodiment 7, the PVA-HTPA$_9$ film prepared in an embodiment 8, and the PVA-HTPA$_{12}$ film prepared in the embodiment 9. FIG. 8 illustrates an XRD spectrogram of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9. As can be seen from FIG. 7, in view of the PVA film, there are characteristic spectral bands at 3290 cm$^{-1}$ and 2930 cm$^{-1}$ respectively, which are attributed to the stretching vibrations of the O—H and a carbon-hydrogen single bond group (C—H), respectively. There are absorption peaks at 1735 cm$^1$, 1240 cm$^1$, 1142 cm$^1$, and 948 cm$^{-1}$ respectively, which are attributed to the stretching vibrations of a carbonyl group (C=O), an ether group (C—O), and a carbon-carbon single bond group (C—C) and a bending vibration of a vinyl group (CH—CH$_2$), respectively. There are two peak values at 1092 cm$^{-1}$ and 1022 cm$^{-1}$ respectively, which are attributed to the vibration of C—O in an aldehyde group (C—OH). A characteristic spectral band at 3290 cm$^{-1}$ is enhanced after the addition of HTPA, which may be due to an overlap of O—H and N—H groups. In addition, this peak appears a slight blue shift, indicating that more hydrogen bonds are formed between the HTPA and the PVA. At the same time, the crystallization sensitivity peak of PVA at 1142 cm$^{-1}$ is attenuated, indicating that the crystallinity is destroyed. It can be seen from FIG. 8 that the PVA film has a sharp diffraction peak at 2θ=19.90°, and has a small and broad diffraction peak appearing at 2θ=32.18°, indicating that the PVA film has a semi-crystalline property. After the HTPA is added, there appears a wide and gentle diffraction peak at 2θ=23.08°, which is caused by the amorphous structure of HTPA. In addition, the characteristic diffraction peak of PVA moves to a lower value, indicating a decrease in crystallinity because that an ordered cumulative density and a molecular chain arrangement of the PVA are destroyed by intermolecular hydrogen bonds newly formed between the HTPA and the PVA.

Figure 9:
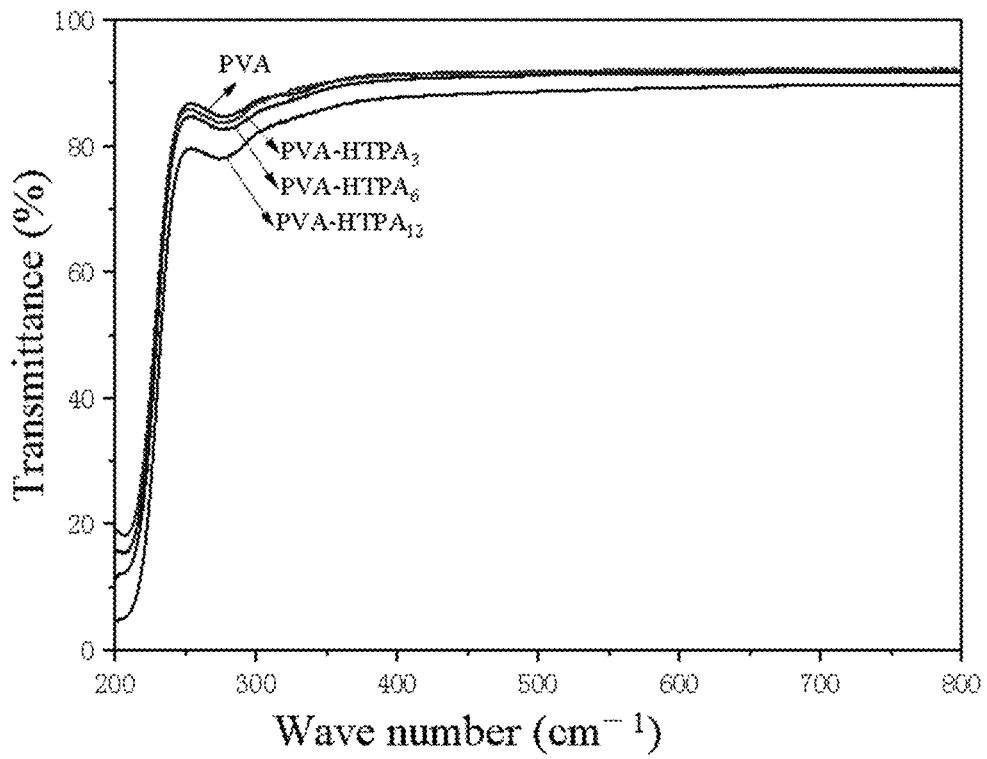
FIG. 9 illustrates a schematic diagram of transmittance spectrum curves of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9.
Figure 10:
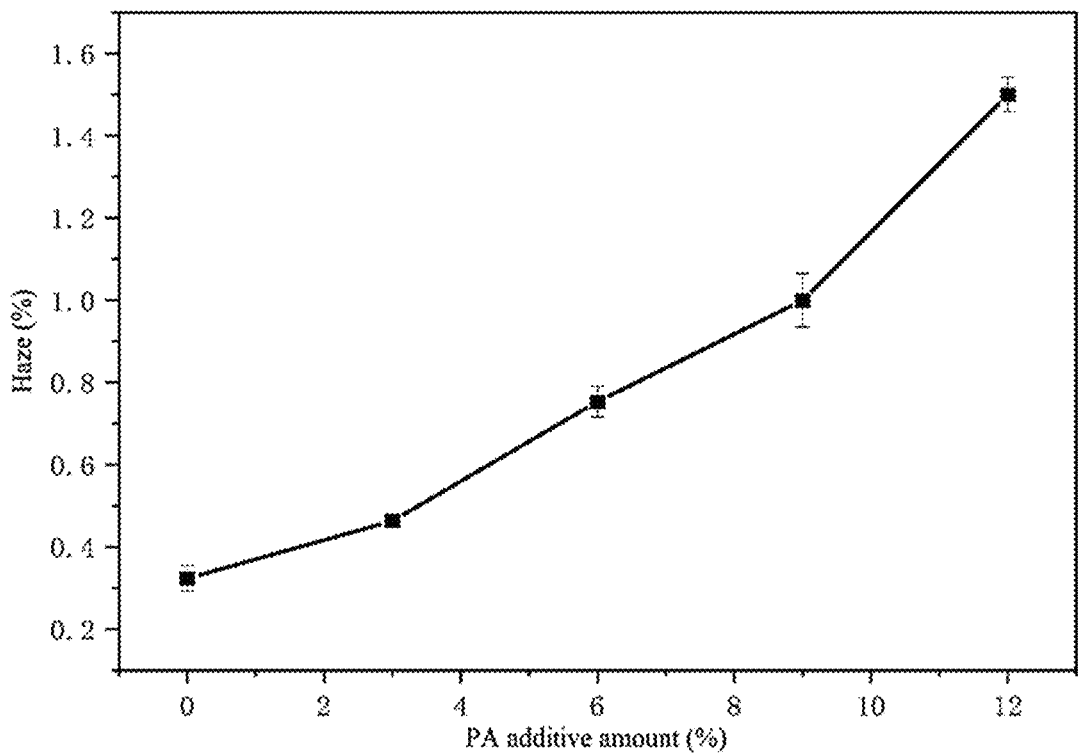
FIG. 10 illustrates a schematic diagram of hazes of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9.

FIG. 9 illustrates a schematic diagram of transmittance spectrum curves of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9. FIG. 10 illustrates a schematic diagram of hazes of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9. As can be seen from FIG. 9 and FIG. 10, as a content of the HTPA increases from 0 to 12 mL, the transmittances of the prepared films at 600 nanometers (nm) decrease from 91.81% to 89.18%, and the haze increase from 0.32% to 1.50%, which are consistent with slight effects on optical properties of the prepared films. Moreover, the effects on the optical properties are due to that aggregation increases refraction and reflection of interface lights, as shown by the mechanism in FIG. 6. However, as shown in the XRD spectrogram of FIG. 8, after introducing the HTPA, crystallinity of the prepared films decreases, resulting in an increase in the transmittances. Thus, the aggregation and the crystallinity effects produce a cancellation effect on the optical properties of the prepared films.

Table 1 illustrates barrier properties and mechanical properties of the PVA film prepared in the comparative example 1, the PVA-HTPA$_3$ film prepared in the embodiment 1, the PVA-HTPA$_6$ film prepared in the embodiment 7, the PVA-HTPA$_9$ film prepared in an embodiment 8, and the PVA-HTPA$_{12}$ film prepared in the embodiment 9.

Table 1 Barrier properties and mechanical properties of PVA-based films with different content of the HTPA

| Sample | Thickness (μm) | WVP (g·s$^{-1}$·m$^{-1}$·Pa$^{-1}$ × 10$^{-8}$) | OP (cm$^3$·mm$^{-2}$·Pa$^{-1}$·day$^{-1}$) | TS (MPa) | EB (%) |
|---|---|---|---|---|---|
| PVA | 72.6 ± 0.80$^d$ | 2.18 ± 0.17$^a$ | 10.49 ± 0.73$^a$ | 70.71 ± 1.70$^d$ | 36.35 ± 1.16$^a$ |
| PVA-HTPA$_3$ | 63.4 ± 3.61$^c$ | 1.46 ± 0.11$^{ab}$ | 1.66 ± 0.04$^a$ | 46.57 ± 2.63$^c$ | 101.27 ± 3.51$^b$ |
| PVA-HTPA$_6$ | 58.0 ± 0.68$^c$ | 1.82 ± 0.08$^{bc}$ | 1.63 ± 0.05$^b$ | 36.71 ± 1.32$^b$ | 122.90 ± 3.36$^c$ |
| PVA-HTPA$_9$ | 58.36 ± 1.74$^b$ | 2.19 ± 0.63$^{bc}$ | 9.90 ± 0.31$^b$ | 31.88 ± 2.05$^a$ | 131.95 ± 1.38$^d$ |
| PVA-HTPA$_{12}$ | 54.0 ± 1.54$^a$ | 2.58 ± 0.98$^c$ | 12.31 ± 0.15$^c$ | 28.62 ± 1.51$^a$ | 179.35 ± 3.79$^e$ |

The mechanical properties are one of the most important parameters that determine the strength and durability of the prepared food packaging film. As shown in Table 1, when the HTPA content increases from 0 to 12 mL, a corresponding tensile strength (TS) drops from 70.71 mega Pascal (MPa) to 28.62 MPa, while a corresponding elongation at break (EB) increases from 36.35% to 179.35%. The above is due to a decrease in crystallinity of the prepared film as the HTPA is introduced, which increases the mobility of the PVA chain to enhance flexibility, but loosens the rigid structure of the PVA chain to attenuate the TS of the prepared film. Moreover, the tensile strengths of the PVA-HTPA$_3$ film, the PVA-HTPA$_6$ film, the PVA-HTPA$_9$ film, and the PVA-HTPA$_{12}$ film can meet requirements of a Chinese national standard titled "Paper and plastics laminated films and pouches for food packaging", i.e., GB/T 30768-2014; and the elongations at break of the above films reaches grade 3 according to a Chinese national standard titled "General rules of laminated films & pouches for packaging", i.e., GB/T 21302-2007.

Table 1 also lists the barrier properties of the prepared films. When the HTPA content increases from 0 mL to 3 mL, the water vapor permeability (WVP) decreases from 2.18× 10$^{-8}$ g·s$^{-1}$·m$^{-1}$·Pa$^{-1}$ (referred to a unit for permeable rate) to 1.46×10$^{-8}$ g·s$^{-1}$·m$^{-1}$·Pa$^{-1}$. Then, when the HTPA content is further increased to 12 mL, the WVP increases to 2.58×10$^{-8}$ g·s$^{-1}$·m$^{-1}$·Pa$^{-1}$ accordingly. A similar trend of first increasing and then decreasing is observed for the oxygen permeability (OP) of the prepared films. When the HTPA content is 6 mL, the lowest value of the OP is 1.63 cm$^3$·mm$^-$2·Pa$^1$·day$^{-1}$. As shown in the FTIR spectrogram, when a small amount of the HTPA is added, more hydrogen bonds are formed to increase the density of the structure, making it difficult for small molecules to diffuse. However, as the HTPA content further increases, the crystallinity of the prepared film decreases, increasing chain mobility and free volume, which is beneficial for the permeation of small molecules. The barrier properties of the PVA-HTPA$_3$ film, the PVA-HTPA$_6$ film, the PVA-HTPA$_9$ film, and the PVA-HTPA$_{12}$ film can all meet requirements of a Chinese national standard titled "Paper and plastics laminated films and pouches for food packaging", i.e. GB/T 30768-2014 for the food packaging film.

Figure 11:
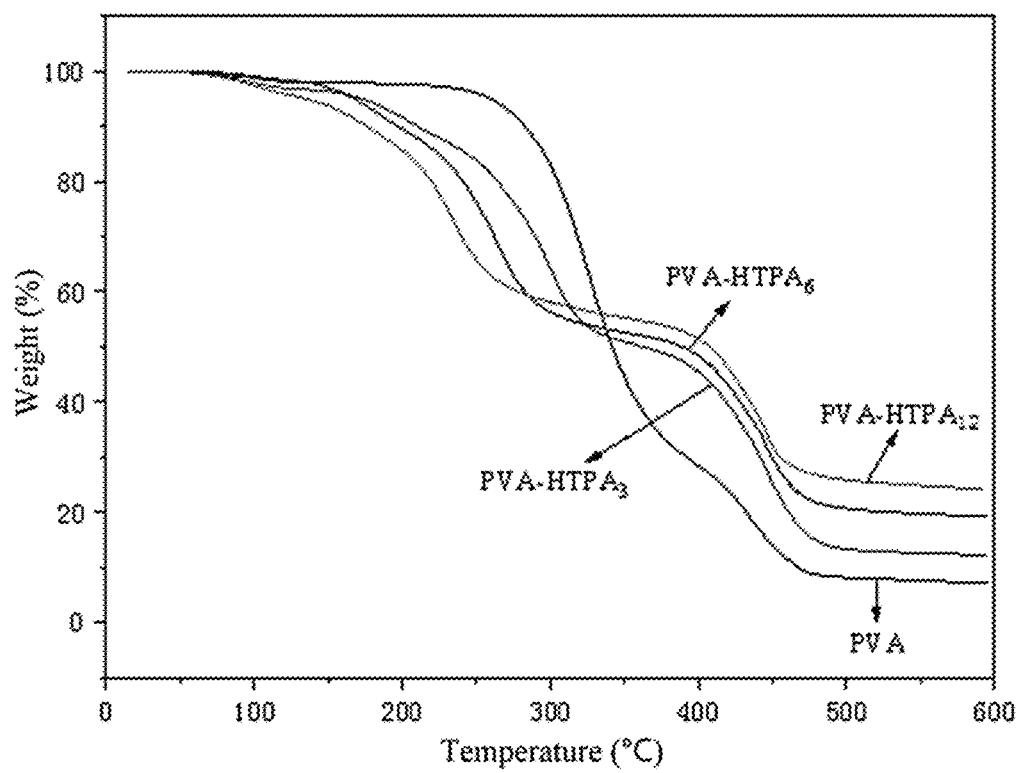
FIG. 11 illustrates a schematic diagram of thermogravimetric (TG) curves of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9.
Figure 12:
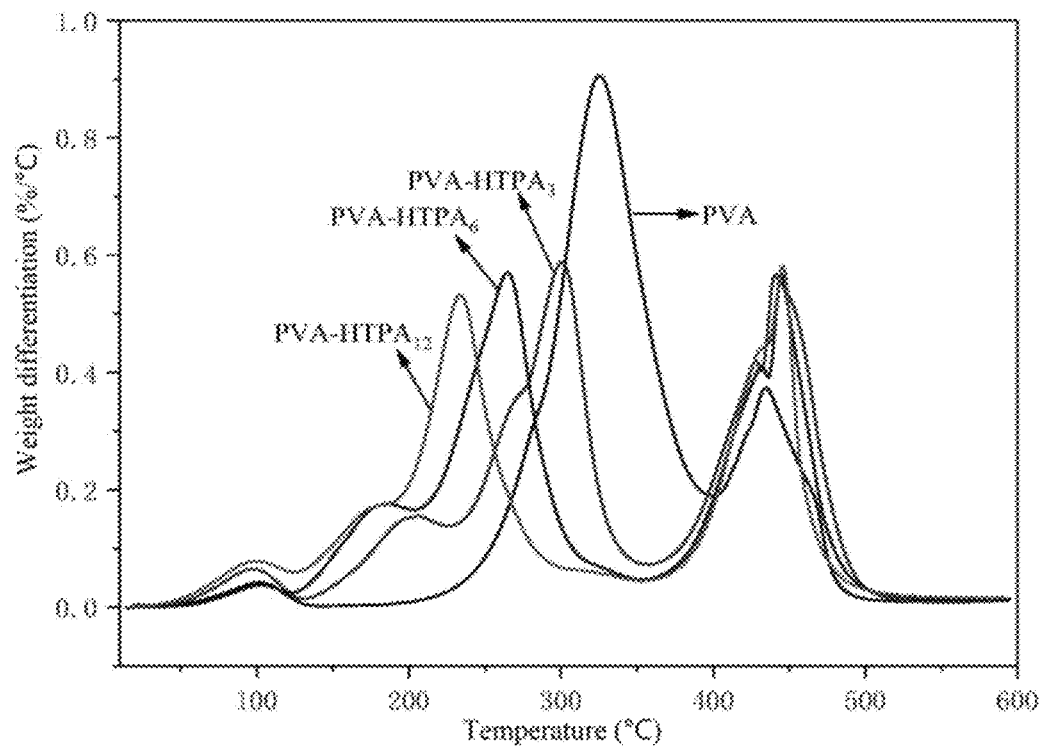
FIG. 12 illustrates a schematic diagram of differential thermogravimetric (DTG) curves of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9.

Thermogravimetric (TG) curves and differential thermogravimetric (DTG) curves of the PVA film prepared in the comparative example 1, the PVA-HTPA$_3$ film prepared in the embodiment 1, the PVA-HTPA$_6$ film prepared in the embodiment 7, and the PVA-HTPA$_{12}$ film prepared in the embodiment 9 are illustrated in FIG. 11 and FIG. 12, and thermal degradation of the prepared films may be revealed by TG analysis to evaluate thermal stability of the prepared films. It can be seen from FIG. 11 and FIG. 12 that the degradation of the PVA film is performed in three steps, and an initial stage from 64° C. to 134° C. is related to water evaporation. A second stage begins at about 200° C., maximum degradation of the PVA film is achieved due to structural degradation and subsequent chain breakage, followed by pyrolysis at 400-510° C. to break down a C—C bond in the PVA main chain. After the HTPA is added, the prepared film appears a five-stage degradation mode. The first stage is due to the water evaporation. The second mass loss phase starts at 125° C. because pyrophosphoric acid is formed by condensation of phosphonic acid groups in the PA. The third stage involves dehydration of the polymer, the formation of polyethylene-like structures in the PVA, and the decomposition of nitrogen-containing groups in the HTCC. The fourth and fifth stages occur at temperatures of about 360° C. to 550° C., which relate to breakage of phosphonate and the ether bond as well as pyrolysis of a hydroxymethyl group in the HTCC. Initial degradation temperatures of the PVA-HTPA$_3$ film, the PVA-HTPA$_6$ film, and the PVA-HTPA$_{12}$ film are all higher than 130° C., which means that these prepared films can be used for packaging chilled meat.

Compared with the PVA film, the PVA-HTPA$_x$ films exhibit different thermal degradation properties. The temperature for the initial degradation stage moves slightly to a lower value, which has little influence on fresh meat packaging. This can be explained by XRD results showing that the crystallinity of PVA is reduced, forming a more loose structure, allowing more unbound water molecules to evaporate more quickly. Further, when the HTPA content is increased, the second and third degradation stages move significantly to the lower temperatures. This is because phosphoric acid and polyphosphate produced by further decomposition of the PA promote bond breaking and dehydration of the polymer (i.e., PEC). Moreover, as the HTPA content increases, residue on the compound film at 590° C. is significantly increased, indicating that it has a strong char-forming ability.

Table 2 illustrates values of limiting oxygen index (LOI) of the PVA film prepared in the comparative example 1, the PVA-HTCC$_6$ film prepared in the comparative example 2, the PVA-PA$_6$ film prepared in the comparative example 3, the PVA-HTPA$_3$ film prepared in the embodiment 1, the PVA-HTPA$_6$ film prepared in the embodiment 7, the PVA-HTPA$_9$ film prepared in the embodiment 8, and the PVA-HTPA$_{12}$ film prepared in the embodiment 9.

Table 2 LOI values of samples according to the embodiments and the comparative examples

| Sample | LOI value (%) |
| --- | --- |
| PVA | 18.27 ± 0.21 |
| PVA-HTCC$_6$ | 18.40 ± 0.14 |
| PVA-PA$_6$ | 26.13 ± 0.82 |
| PVA-HTPA$_3$ | 23.53 ± 0.51 |
| PVA-HTPA$_6$ | 28.10 ± 0.14 |
| PVA-HTPA$_9$ | 31.13 ± 0.09 |
| PVA-HTPA$_{12}$ | 33.30 ± 0.14 |

The LOI values of the PVA film prepared in the comparative example 1, the PVA-HTCC$_6$ film prepared in the comparative example 2, the PVA-PA$_6$ film prepared in the comparative example 3, the PVA-HTPA$_3$ film prepared in the embodiment 1, the PVA-HTPA$_6$ film prepared in the embodiment 7, the PVA-HTPA$_9$ film prepared in the embodiment 8, and the PVA-HTPA$_{12}$ film prepared in the embodiment 9 are shown in Table 2. The LOI values of the PVA film and the PVA-HTCC$_6$ are less than 20%, which indicates that the PVA film and the PVA-HTCC$_6$ are flammable materials, requiring less oxygen content to burn rapidly. The LOI value of the PVA-PA$_6$ film reaches 26.13%, demonstrating that the addition of PA improves the flame retardant effect of the PVA film. Notably, the LOI value of the PVA-HTPA$_6$ film reaches 28.10% higher than those of the PVA-HTCC$_6$ film and the PVA-PA$_6$ film, indicating that there is a synergistic effect between the PA and the HTCC. Moreover, as the HTPA content reaches 12 mL, the LOI value of the PVA-HTPA$_{12}$ film reaches 33.30%, which demonstrates that the HTPA imparts a good flame retardant effect to the prepared film.

Combustion tests are conducted on the PVA film, the PVA-HTCC$_6$ film, the PVA-PA$_6$ film, the PVA-HTPA$_3$ film, and the PVA-HTPA$_6$ film. The tests show that the PVA film is easily ignited and rapidly combusted within about 10 seconds (s) with vigorous flame and severe melt droplets. Unlike the PVA film, the PVA-HTCC$_6$ film may be continuously combusted for about 15 s and is not ignited for the first time, indicating that the flame retardant efficiency of the prepared film is not significant when the HTCC is added alone. For the PVA-PA$_6$ film, its combustion behavior is similar to that of the PVA-HTCC$_6$ film, observing self-extinguishing without melt droplets. For the PVA-HTPA$_3$ film, the flame spread of the film is significantly inhibited and burned out at about 25 s, indicating that the PVA-HTPA$_3$ film has a stronger ability to prevent flame spread than the PVA-HTCC$_6$ film and the PVA-PA$_6$ film. The PVA-HTPA$_6$ film can be successfully ignited for the first time and then is immediately self-extinguished after the igniter is removed. These results demonstrate that the flame retardancy of the HTPA-containing films is superior to those prepared films containing only the HTCC or the PA.

Figure 13:
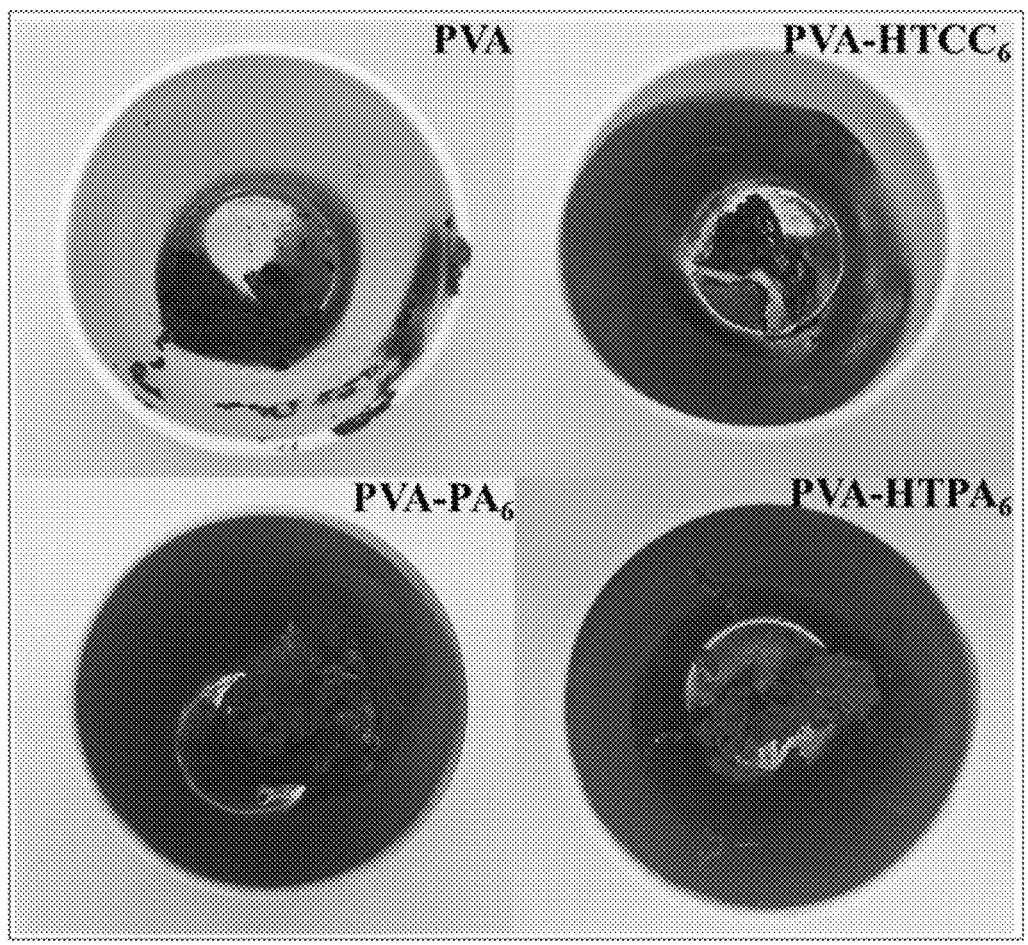
FIG. 13 illustrates a schematic diagram of products obtained by burning the PVA film, the PVA-HTCC$_6$ film, the PVA-PA$_6$ film, and the PVA-HTPA$_6$ film for 20 seconds (s) with a butane spray gun.
Figure 14A:
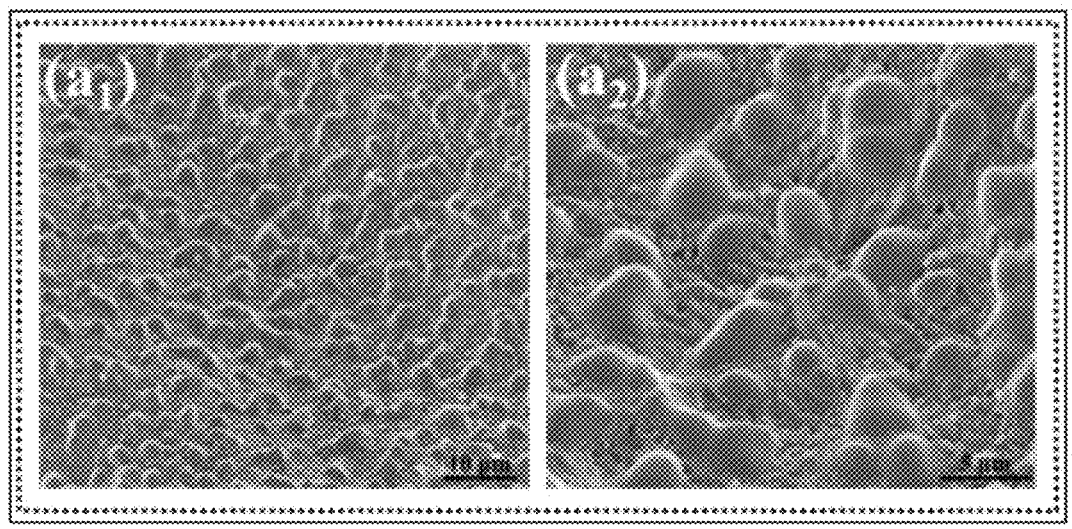
FIG. 14A illustrates a schematic diagram of a carbon layer of the PVA-HTCC$_6$ film by the SEM.
Figure 14B:
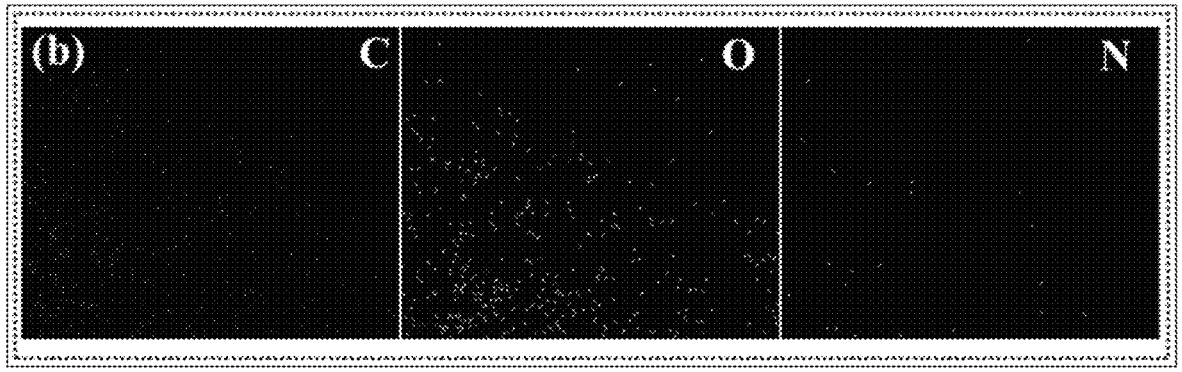
FIG. 14B illustrates a schematic diagram of elementary composition of the PVA-HTCC$_6$ film.
Figure 15A:
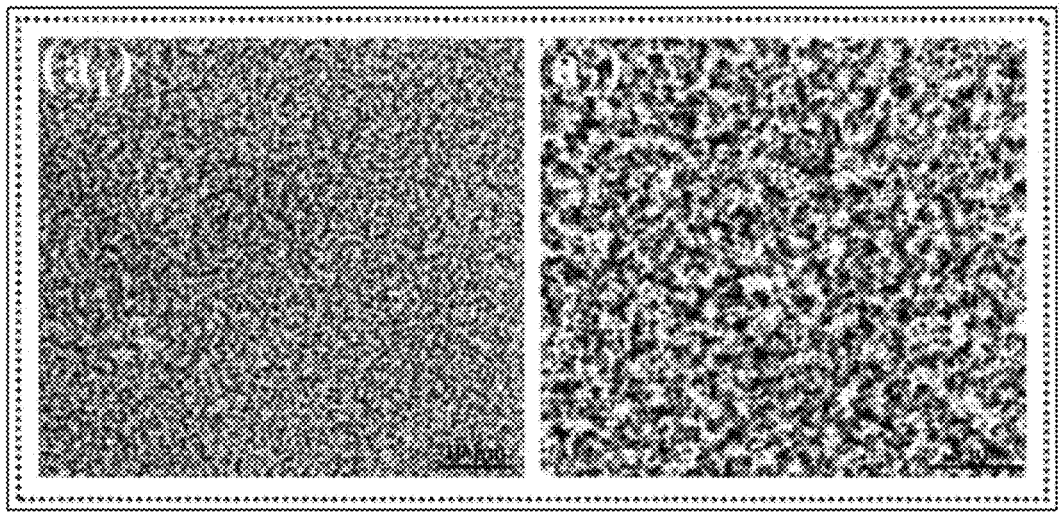
FIG. 15A illustrates a schematic diagram of a carbon layer of the PVA-PA$_6$ film by the SEM.
Figure 15B:
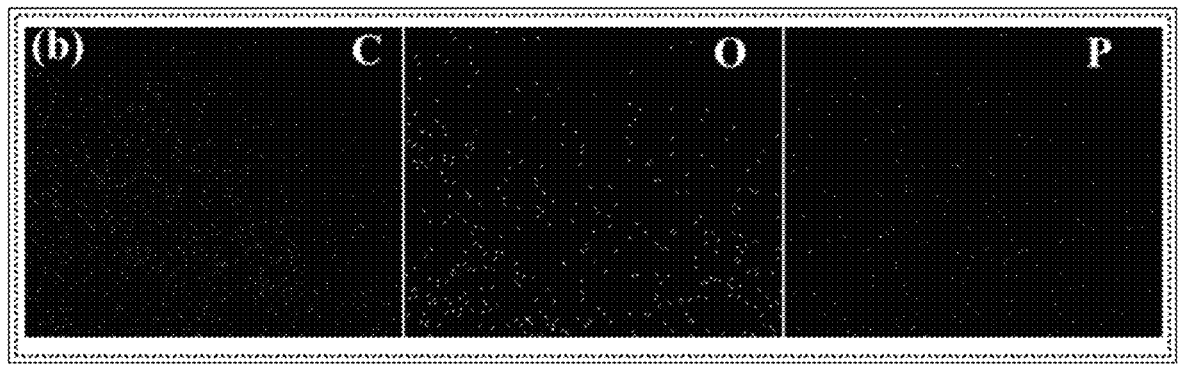
FIG. 15B illustrates a schematic diagram of elementary composition of the PVA-PA$_6$ film.
Figure 16A:
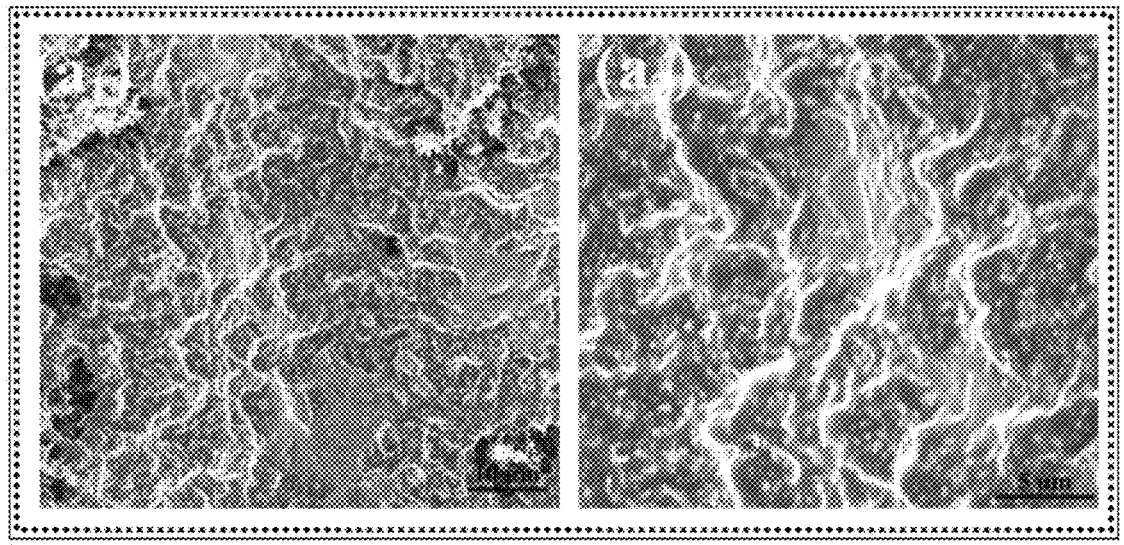
FIG. 16A illustrates a schematic diagram of a carbon layer of the PVA-HTPA$_6$ film by the SEM.
Figure 16B:
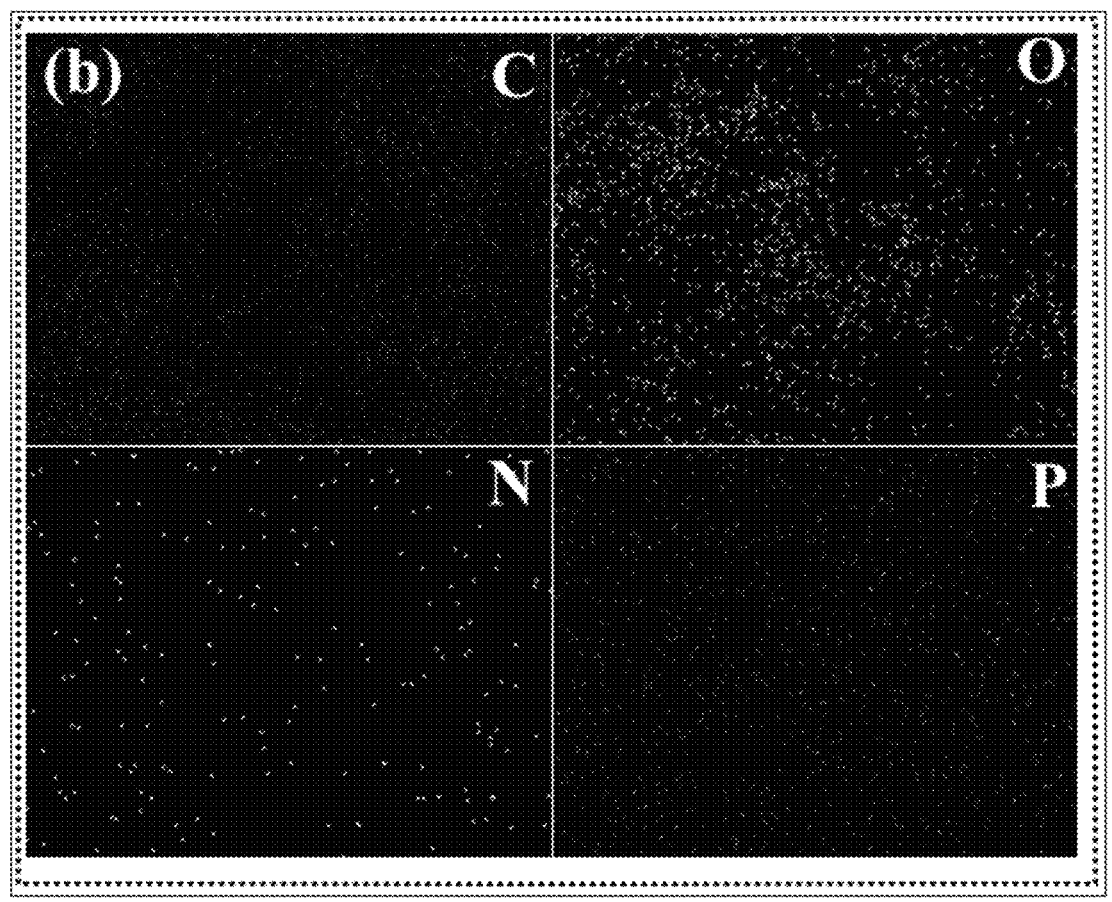
FIG. 16B illustrates a schematic diagram of elementary composition of the PVA-HTPA$_6$ film.

To further demonstrate the synergistic flame retardant effect of HTCC and PA, the PVA film (also referred to a pure PVA film), the PVA-HTCC$_6$ film, the PVA-PA$_6$ film, and the PVA-HTPA$_6$ film are combusted with butane spray guns for 20 s to obtain char residue. FIG. 13 illustrates a schematic diagram of products (i.e., char residues) obtained by burning the PVA film, the PVA-HTCC$_6$ film, the PVA-PA$_6$ film, and the PVA-HTPA$_6$ film. It can be seen from FIG. 13 that a small amount of the char residue is observed in view of the PVA film and the PVA-HTCC$_6$ film, indicating that the prepared film only containing the HTCC is unable to promote a formation of a carbon layer. After the PVA-PA$_6$ film and the PVA-HTPA$_6$ film are ignited, a continuous and expanded carbon layer is observed, which prevents the transfer of heat and combustible gases, thereby improving flame retardancy. FIGS. 14A to 14B illustrate the carbon layer of the PVA-HTCC$_6$ film by the SEM and elementary composition of the PVA-HTCC$_6$ film. FIGS. 15A to 15B illustrate the carbon layer of the PVA-PA$_6$ film by the SEM and elementary composition of the PVA-PA$_6$ film. FIGS. 16A to 16B illustrate the carbon layer of the PVA-HTPA$_6$ film by the SEM and elementary composition of the PVA-HTPA$_6$ film. Moreover, the elements on the char residues of these films are shown in Table 3.

Table 3 Elements on the char residue of the films

| Atomic percentage | Carbon (C) | Oxygen (O) | Nitrogen (N) | Phosphorus (P) |
|---|---|---|---|---|
| PVA-HTCC$_6$ | 55.31 | 42.42 | 2.28 | — |
| PVA-PA$_6$ | 80.81 | 17.47 | — | 1.72 |
| PVA-HTPA$_6$ | 62.12 | 17.16 | 1.94 | 18.78 |

Morphologies of the carbon layers of the PVA-HTCC$_6$ film, the PVA-PA$_6$ film, and the PVA-HTPA$_6$ film are characterized by the SEM and energy dispersive X-Ray spectroscopy (EDS) to further explore the mechanism of synergistic flame retardancy between HTCC and PA. As can be seen from FIG. 14, for the PVA-HTCC$_6$ film, some bubbles are observed due to the escape of non-combustible gas produced by HTCC degradation, and a large number of pores are observed, which means that the brittle carbon layer results in poor flame retardancy. As can be seen from FIG. 15, for the PVA-PA$_6$ film, a uniform honeycomb structure consisting of carbon particles on a surface of the carbon layer is observed because the PA can act as a catalyst, directly promoting the dehydration and carbonization of PVA during combustion. As can be seen in FIG. 16, the char residue of the PVA-HTPA$_6$ film is significantly layered, with a denser and more continuous surface and a honeycomb interior. This reflects a more cross-linked structure consisting of HTCC and PA, which significantly increases viscosity of the char residue, reduces the ability of the gas to escape, and causes the carbon layer to have an expanded morphology by the synergistic effect of phosphorus and nitrogen. A flame-retardant mechanism of the prepared film is further verified based on the EDS result and the element distribution diagram. The elements of carbon, oxygen, nitrogen, and phosphorus are uniformly distributed in the residual carbon of the PVA-HTPA$_6$ film with contents of 62.2%, 17.16%, 1.94%, and 18.78%, respectively. It should be noted that the content of N element in the PVA-HTPA$_6$ film is lower than that in the PVA-HTCC$_6$ film because the catalytic action of the phosphorus derivative causes the nitrogen-containing group in the HTCC to release a large amount of non-combustible gas, thereby diluting the combustible gas. In addition, the content of P element in the PVA-HTPA$_6$ film is 10.92 times of the PVA-PA$_6$ film, indicating that the incorporation of nitrogen-containing HTCC can promote the formation of the phosphorus-containing crosslinked structure.

Figure 17:
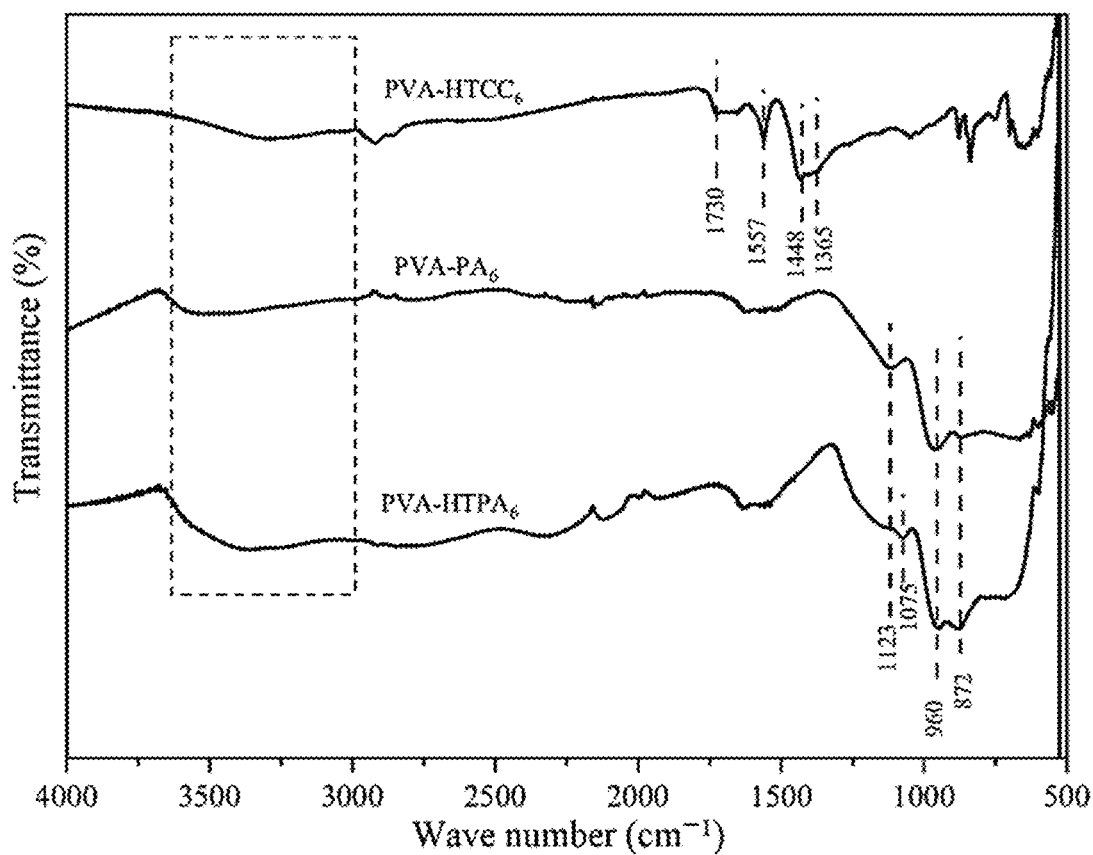
FIG. 17 illustrates a FT-IR spectrogram of the PVA-HTCC$_6$ film, the PVA-PA$_6$ film, and the PVA-HTPA$_6$ film.

To obtain more detailed information of the carbon layer, the PVA-HTCC$_6$ film, the PVA-PA$_6$ film, and the PVA-HTPA$_6$ film are subjected to FT-IR analysis. As shown in FIG. 17, in the carbon layer spectrum of the PVA-HTCC$_6$ film, there is a broad peak at 3622-2989 cm$^{-1}$ due to the stretching vibrations of O—H and N—H. There are absorption peaks at 1557 cm$^{-1}$ and 1448 cm$^{-1}$ corresponding to the stretching vibrations of the amide groups. A stretching vibration of C—N—C attributes to a peak at 1365 cm$^{-1}$. In view of char residue of the PVA-PA$_6$ film, there are peaks disposed at 1123 cm$^{-1}$ and 960 cm$^{-1}$ attributed to the stretching vibrations of P=O and P—O—P, respectively. The spectrum of char residue in the PVA-HTPA$_6$ film has a significant change; due to the stretching vibration of P—O—C, a new peak occurs at 1075 cm$^{-1}$, which effectively promotes the formation of the carbon layer. These results indicate that the non-combustible gas produced by the HTCC decomposition not only takes away a large amount of heat, but also dilutes the oxygen, reducing the decomposition rates of PVA and PA, which facilitates the formation of phosphate-carbon complex in the char residues. In addition, the characteristic peaks of the C—N—C and amide groups are not observed because the catalytic action of the phosphorus derivative accelerates the thermal degradation of the HTCC and promotes the evolution of many non-combustible gases, such as nitrogen (N$_2$) and ammonia (NH$_3$), from the nitrogen-containing groups. These results are consistent with results of analysis of EDS.

Figure 18:
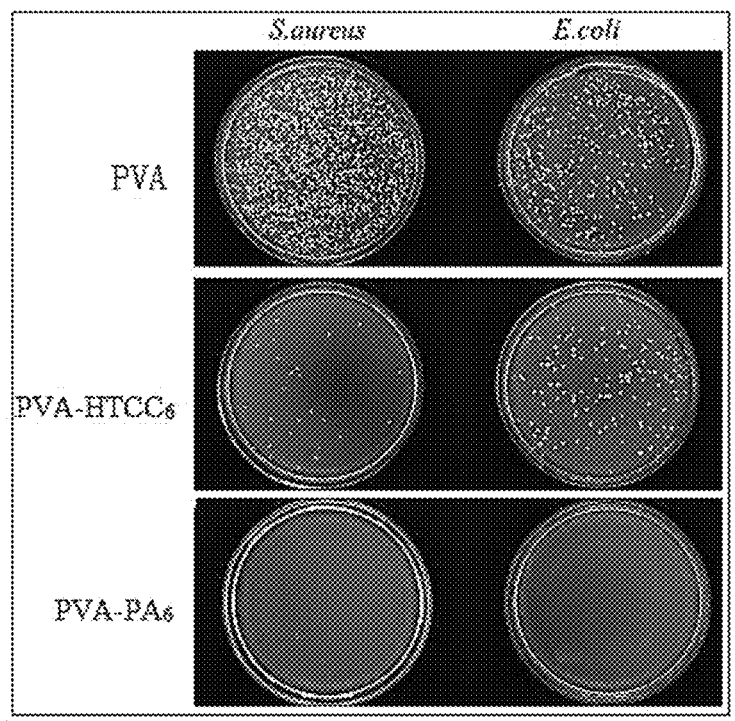
FIG. 18 illustrates a schematic diagram of antibacterial effects of the PVA film prepared in the comparative example 1, the PVA-HTCC$_6$ film prepared in the comparative example 2, and the PVA-PA$_6$ film prepared in the comparative example 3.
Figure 19:
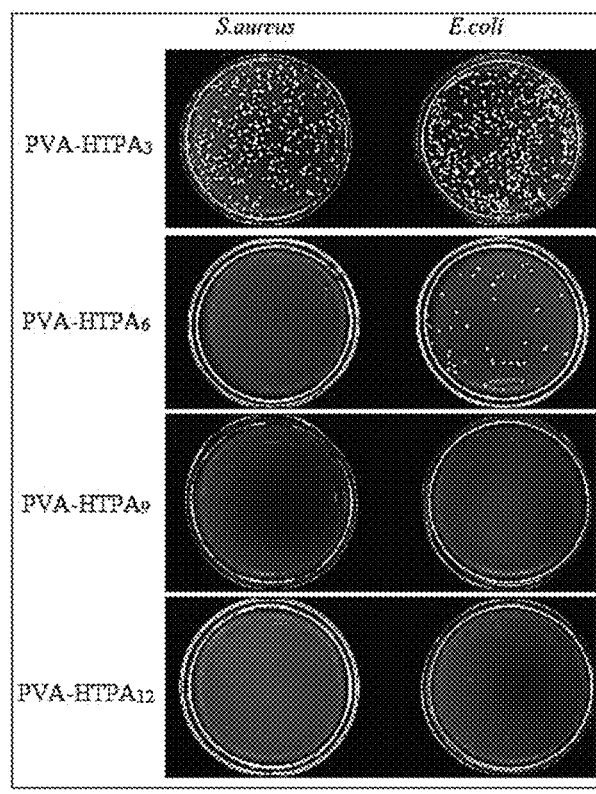
FIG. 19 illustrates a schematic diagram of antibacterial effects of the PVA-HTPA$_3$ film prepared in the embodiment 1, the PVA-HTPA$_6$ film prepared in the embodiment 7, the PVA-HTPA$_9$ film prepared in the embodiment 8, and the PVA-HTPA$_{12}$ film prepared in the embodiment 9.

FIG. 18 illustrates antibacterial effects of the PVA film prepared in the comparative example 1, the PVA-HTCC$_6$ film prepared in the comparative example 2, and the PVA-PA$_6$ film prepared in the comparative example 3. FIG. 19 illustrates antibacterial effects of the PVA-HTPA$_3$ film prepared in the embodiment 1, the PVA-HTPA$_6$ film prepared in the embodiment 7, the PVA-HTPA$_9$ film prepared in the embodiment 8, and the PVA-HTPA$_{12}$ film prepared in the embodiment 9. Compared FIG. 18 with FIG. 19, it can be seen that the antibacterial rates of the PVA-HTPA$_6$ film, the PVA-HTPA$_9$ film, and the PVA-HTPA$_{12}$ film on the *Escherichia coli* (*E. coli*) and the *Staphylococcus aureus* (*S. aureus*) are significantly higher than that of the PVA-HTCC$_6$ film, but are slightly lower than that of the PVA-PA$_6$ film. However, the antibacterial effect of the PVA-HTPA$_3$ film is slightly poor. This is because divalent cations in lipopolysaccharide of the bacteria may chelate the reactive phosphate groups of the PA, while cell walls of the bacteria may be damaged by the low pH value and amino reactions performed between anionic groups on microbial cell membrane and positive charges of the HTCC. However, strong electrostatic interaction between HTCC and PA reduces charge density, thereby weakening antibacterial ability.

The PVA film prepared in the comparative example 1, the PVA-HTCC$_6$ film prepared in the comparative example 2, the PVA-PA$_6$ film prepared in the comparative example 3, the PVA-HTPA$_3$ film prepared in the embodiment 1, the PVA-HTPA$_6$ film prepared in the embodiment 7, the PVA-HTPA$_9$ film prepared in the embodiment 8, and the PVA-HTPA$_{12}$ film prepared in the embodiment 9 are used to package the pork for refrigeration. During the refrigeration, variations in the appearance, weight loss rate (WLR), malondialdehyde, and total viable count (TVC) of the pork packaged by the different films are observed to obtain corresponding results as follows.

An appearance of an unpacked sample (i.e., unpackaged pork) is satisfactory at the beginning of the experiment. However, after 9 days, the unpacked sample becomes dry, wrinkled and darker due to water loss and formation of metmyoglobin. Compared with the unpackaged sample, all of the samples packaged by the prepared films appear relatively plump, since the prepared films act as barriers, preventing permeation of water and oxygen molecules. However, the sample packaged by the PVA-PA$_6$ film is darker than other samples, with a disappointing appearance. This may be because that, after the PA is added, the pH value of the pork drops sharply, denaturing the protein and changing myofibrillar structure, thereby discoloring the pork.

Figure 20:
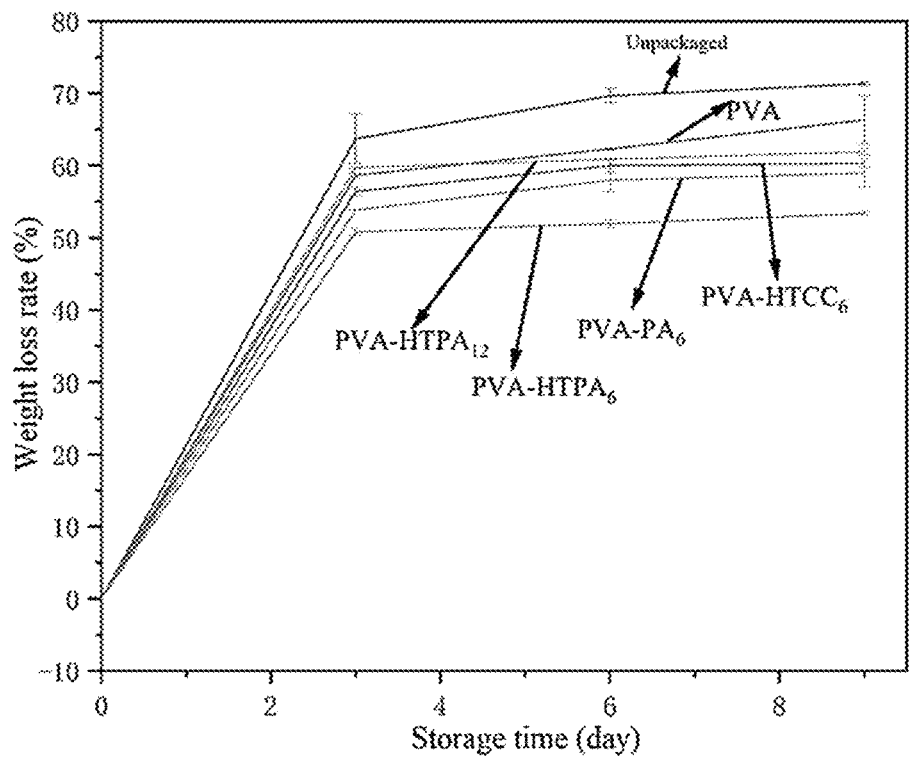
FIG. 20 illustrates a schematic diagram of variation curves of weight loss rates (WLR) in a refrigerated storage of pork packaged by the films over storage time.

Water vapor is a major factor affecting the WLR during pork storage. FIG. 20 illustrates variation curves of the WLR of the pork packaged by the prepared films over storage time during refrigerated storage. As shown in FIG. 20, as the storage time is extended, the WLRs of all pork samples packaged by the prepared films are lower than that of the unpacked pork because the barrier effect inhibits the transmission of water vapor. The pork sample packaged by the PVA-PA$_6$ film shows the lowest WLR because water vapor is slowly evaporated due to the formation of a large number of new hydrogen bonds generated by the water vapor with many hydroxyl groups contained in the PA. At the same time, the WLR of the pork sample packaged by the PVA-HTPA$_6$ film is slightly higher than the pork sample packaged by the PVA-PA$_6$ film, but is significantly lower than the samples packaged by the other prepared films.

Figure 21:
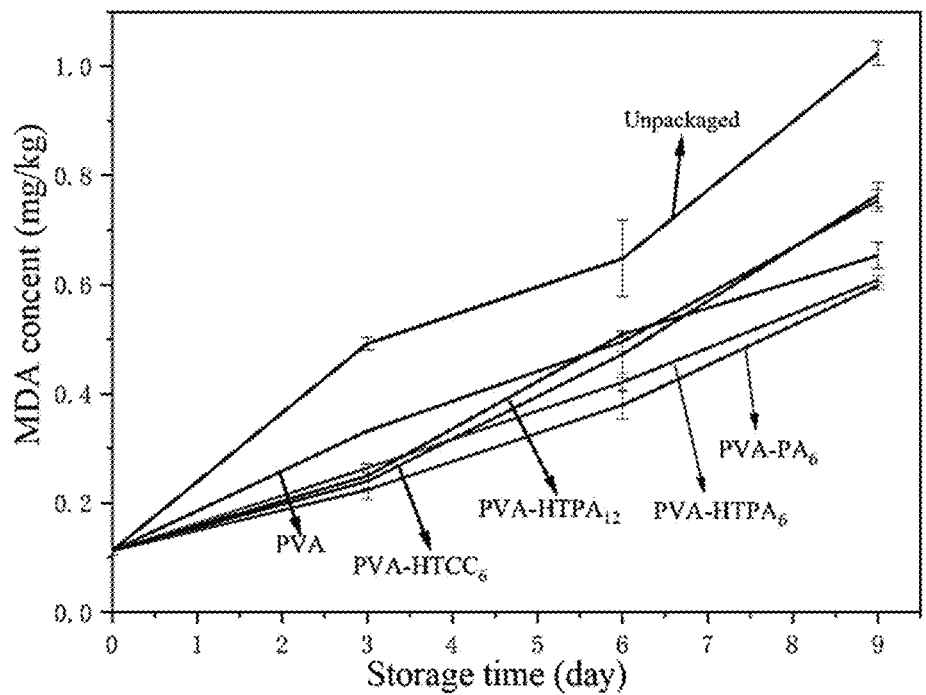
FIG. 21 illustrates a schematic diagram of variation curves of malondialdehyde ($C_3H_4O_2$ abbreviated as MDA) contents in the refrigerated storage of the pork packaged by the films over the storage time.

The malondialdehyde (MDA) content may reflect an extent of fat oxidation in the refrigerated pork. FIG. 21 illustrates variation curves of the MDA of the pork packaged by the films over the storage time during the refrigerated storage. As shown in FIG. 21, the MDA content of the unpackaged sample is rapidly increased, and the MDA content exceeds a limit value of 1.0 mg/kg on the 9-th storage day. The samples packaged by the PVA film and the PVA-HTCC$_6$ film are kept within the limit value because these prepared films inhibit the transmittance of oxygen to slow the fat oxidation in the pork but maintain a relatively high fat oxidation efficiency. The MDA content of the sample packaged by the film containing the PA or the HTPA is significantly lower than those of other samples. In addition, the MDA content of the sample pork packaged by the PVA-HTPA$_6$ film is lower than that of the PVA-HTPA$_{12}$ film. This may be because the OP of the PVA-HTPA$_6$ film is 7.6 times lower than the OP of the PVA-HTPA$_{12}$ film. Therefore, it can effectively inhibit the transmittance of oxygen, thereby slowing the fat oxidation.

Figure 22:
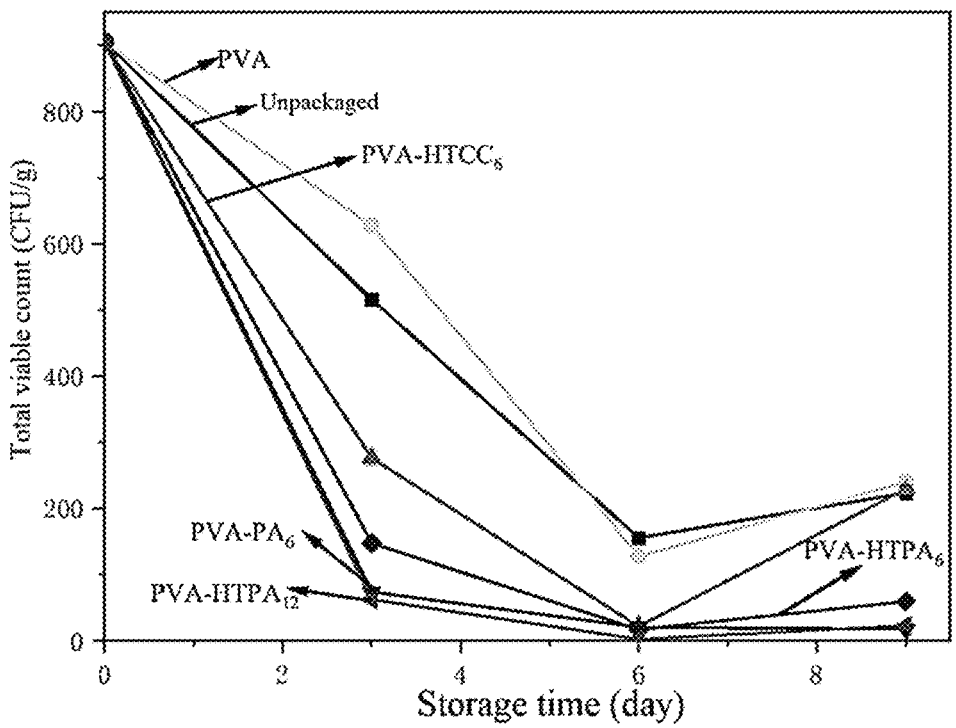
FIG. 22 illustrates a schematic diagram of variation curves of total viable counts (TVC) in the refrigerated storage of the pork packaged by the films over the storage time.

The TVC is a quantitative hygiene indicator for determining pork processing conditions and contamination levels. FIG. 22 illustrates variation curves of the TVCs of the pork packaged by the films over the storage time during the refrigerated storage. As shown in FIG. 22, the TVC of the unpackaged sample and the TVC of the sample packaged by the PVA film both exhibit a tendency to rise first and then rise. This phenomenon is due to the large amount of water lost, and propagation of microorganisms in the pork needs the water. However, slow moisture reduction and rich protein levels promote microbial reproduction after 6 days of storage. While similar tendencies are observed for the samples packaged by the HTCC-containing films, the PA-containing films, and the HTPA-containing films, the TVC values for these films are lower than that of the unpackaged sample, especially the PVA-PA$_6$ and the PVA-HTPA$_{12}$ films, indicating that the films incorporating the PA or the HTPA have satisfactory antibacterial effects. Moreover, petri dishes for the unpackaged sample and the samples packaged by the PVA film and the PVA-HTCC$_6$ film are observed molds from unsterilized environments, but the molds are not observed in the petri dishes of the other samples. These results show that PA and HTPA can impart antifungal properties to the prepared films.

What is claimed is:

1. A preparation method of a high-barrier antibacterial flame-retardant food packaging film, comprising the following steps:

step 1, adding chitosan quaternary ammonium salt into distilled water according to a mass percent concentration of the chitosan quaternary ammonium salt in a range of 2% to 4%, and uniformly stirring the chitosan quaternary ammonium salt and the distilled water to obtain a chitosan quaternary ammonium salt solution; adding phytic acid according to a mass percent concentration of the phytic acid of 50% into the chitosan quaternary ammonium salt solution, and stirring the chitosan quaternary ammonium salt solution added with the phytic acid for a range of 0.5 hours (h) to 1 h to obtain a polyelectrolyte complex; wherein a volume of the phytic acid is in a range of 80% to 120% of a volume of the chitosan quaternary ammonium salt solution;

step 2, adding polyvinyl alcohol into distilled water according to a mass percent concentration of the polyvinyl alcohol in a range of 0.02 grams per milliliter (g/mL) to 0.04 g/mL, and stirring the polyvinyl alcohol and the distilled water for 1-1.5 h at a temperature of 70-80 degrees Celsius (° C.) to obtain a polyvinyl alcohol solution; adding the polyelectrolyte complex into the polyvinyl alcohol solution according to a volume ratio of the polyvinyl alcohol solution to the polyelectrolyte complex of 100:(2-4), stirring the polyvinyl alcohol solution added with the polyelectrolyte complex for 1-1.5 h at a temperature of 70-80° C. to obtain a mixture, and defoaming the mixture to obtain a film-forming solution; and step 3, pouring the film-forming solution into a mold, and leveling the film-forming solution in the mold and then drying the leveled film-forming solution to obtain the high-barrier antibacterial flame-retardant food packaging film.

2. The preparation method of the high-barrier antibacterial flame-retardant food packaging film according to claim 1, wherein in the step 1, after the chitosan quaternary ammonium salt is added into the distilled water, a time for the stirring the chitosan quaternary ammonium salt and the distilled water is in a range of 0.5 h to 1 h to obtain the chitosan quaternary ammonium salt solution.

3. The preparation method of the high-barrier antibacterial flame-retardant food packaging film according to claim 1, wherein in the step 2, the defoaming the mixture comprises: defoaming the mixture in an ultrasonic instrument for 30 minutes (min) to 60 min.

4. The preparation method of the high-barrier antibacterial flame-retardant food packaging film according to claim 1, wherein in the step 3, a time for the drying is in a range of 24 h to 48 h; and a temperature for the drying is in a range of 50° C. to 60° C.

* * * * *